US 006990080B2

(12) United States Patent
Bahl et al.

(10) Patent No.: US 6,990,080 B2
(45) Date of Patent: Jan. 24, 2006

(54) DISTRIBUTED TOPOLOGY CONTROL FOR WIRELESS MULTI-HOP SENSOR NETWORKS

(75) Inventors: Paramvir Bahl, Issaquah, WA (US); Li Li, Iselin, NJ (US); Yi-Min Wang, Bellevue, WA (US); Roger P. Wattenhofer, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 932 days.

(21) Appl. No.: 09/925,846

(22) Filed: Aug. 7, 2001

(65) Prior Publication Data

US 2002/0044533 A1    Apr. 18, 2002

Related U.S. Application Data

(60) Provisional application No. 60/223,395, filed on Aug. 7, 2000.

(51) Int. Cl.
    H04L 12/28      (2006.01)
(52) U.S. Cl. ...................................... 370/254
(58) Field of Classification Search ................ 370/254, 370/255, 252, 238, 328, 331, 400, 503, 338, 370/349, 466, 461, 447, 445, 351, 344, 488, 370/436; 455/456.5, 434, 574, 62; 709/220; 375/222
    See application file for complete search history.

(56) References Cited

U.S. PATENT DOCUMENTS

| 5,987,011 | A  | * | 11/1999 | Toh | ............................. | 370/331 |
| 6,304,556 | B1 | * | 10/2001 | Haas | .......................... | 370/254 |
| 6,512,935 | B1 | * | 1/2003  | Redi | ........................... | 455/574 |
| 6,601,093 | B1 | * | 7/2003  | Peters | ....................... | 709/220 |
| 6,704,293 | B1 | * | 3/2004  | Larsson et al. | ............. | 370/255 |
| 6,845,091 | B2 | * | 1/2005  | Ogier et al. | ................ | 370/338 |
| 6,859,463 | B1 | * | 2/2005  | Mayor et al. | ............... | 370/445 |

OTHER PUBLICATIONS

Rodoplu, V. et al.; "Minimum Energy Mobile Wireless Networks" IEEE Journal of Selected Areas in Communications, Aug. 1999, pp. 1333-1344.

Ramanathan, Ram et al.; "Topology Control of Multihop Wireless Networks using Transmit Power Adjustment" in Proceedings of IEEE Infocom 2000, Mar. 2000, 10 pages.

Clare, L.P. et al.; "Self-Organizing Distributed Sensor Networks" in Proceedings of SPIE Conference on Unattended Ground Sensor Technologies and Applications, Apr. 1999, pp. 229-237.

Wattenhofer, R. et al.; "Distributed Topology Control for Power Efficient Operation in Multihop Wireless Ad Hoc Networks" Proceedings of IEEE Infocom 2001, Apr. 2001, 10 pages.

(Continued)

*Primary Examiner*—Chi Pham
*Assistant Examiner*—Prenell Jones
(74) *Attorney, Agent, or Firm*—Lee & Hayes, PLLC

(57) ABSTRACT

The following description provides direction-based topology control to a distributed wireless multi-hop network. The network includes multiple potentially mobile nodes. Each node sends a discovery message in all directions. Each node discovers a set of neighboring nodes using a set of incoming signals from the neighboring nodes that are responsive to the discovery message. Responsive to receiving the incoming messages, each node makes a local decision about a substantially optimal transmission power with which to communicate with at least a portion of the discovered neighboring nodes. The decisions are based on the incoming signals and are also independent of positional information (e.g., latitude and longitude). Each node in the network maintains communications with the decided portion of nodes to provide connectivity between each of the nodes.

39 Claims, 13 Drawing Sheets

OTHER PUBLICATIONS

Bahl, V. et al.; "Distributed Topology Control for Multihop Wireless Sensor Networks Using Directional Information" Aug. 2000, 15 pages.

Keil, J.M. et al.; "Classes of Graph which Approximate the Complete Euclidean Graph" Discrete & Computational Geometry, 1992, pp. 13-28.

Hu, Limin; "Topology Control for Multihop Packet Radio Networks" IEEE Transactions on Communications v.41 n.10, Oct. 1993, pp. 1474-1481.

Kahn, Robert E.; "The Orgainization of Computer Resources into a Packet Radio Network" IEEE Transactions on Communications v. com-25 n1, Jan. 1977, pp. 169-178.

Pottie, G.J. et al.; "Wireless Integrated Network Sensors" Communications of the ACM v.43 n5, May 2000, pp. 51-58.

Hassin Y. et al.; "Sparse Communication Networks and Efficient Routing in the Plane" Proceedings of the 19th ACM Symposium on Principles of Distributed Computing, 2000, pp. 41-50.

* cited by examiner

DISTRIBUTED TOPOLOGY CONTROL FOR WIRELESS MULTI-HOP SENSOR NETWORKS

RELATED APPLICATIONS

This patent application claims priority to U.S. provisional application Ser. No. 60/223,395 filed on Aug. 7, 2000 and titled "Wireless Network Topology Control Methods and Arrangements", which is hereby incorporated by reference.

TECHNICAL FIELD

The following description relates to network topology. More particularly, the following description pertains to providing distributed topology control to a multi-hop wireless network.

BACKGROUND

A Multi-hop network is a collection of wireless mobile computing nodes dynamically forming a temporary network without the use of any existing network infrastructure or centralized administration. Multi-hop networks include packet-radio networks, ad-hoc networks, and sensor networks. As network size grows, communication between two nodes may go through multiple wireless links, or through multiple "hops" for one node to exchange data with another node across the wireless network. This multi-hop aspect occurs for a number of different reasons, for example, because of limited transmission range of wireless devices, communication path obstacles, spatial spectrum reuse, power saving considerations (the lifetime of a network that is operating on battery power is limited by the capacity of its energy source), and so on.

Unlike wired networks that typically have fixed network topology (except in case of node failures), real-time physical displacement, or mobility of network nodes in a multi-hop network is common because of the nature of the applications multi-hop networks are designed to support (e.g., applications for disaster recovery, battlefield, search and rescue, sensor nets, and so on). Because of node mobility, each node in a wireless network may change network topology by adjusting transmission power to control the set of one-hop neighbors, or nodes that are in communication with the node. Multi-hopping combined with a large network size, node mobility, device heterogeneity, bandwidth limitations, and battery power limitations make wireless multi-hop network topology control a major challenge.

The primary goal of topology control is to design power efficient algorithms that maintain network connectivity and optimize performance metrics such as network lifetime and throughput. Conventional techniques to provide wireless distributed multi-hop network topology control typically require positional information such as positional information that is acquired from a Global Positioning System (GPS) implementation at each node in the network. This positional information requirement for topology control is problematic for a number of reasons.

Even in an ideal environment acquisition of positional information may take a substantial amount of time—negatively impacting network response time and throughput. The actual amount of time that it takes to acquire positional information typically depends on how quickly each respective node can establish communication with multiple satellites and exchange data with the satellites to obtain corresponding positional data. Thus, respective nodes in the network may have to wait for an indeterminate, and potentially infinite amount of time before receiving positional information. This is because positional information can only be reliably acquired in a limited number of environments.

Certain environments can completely block or substantially hamper satellite signals to nodes in a wireless multi-hop network. For instance, GPS signals are often undetectable or sporadic in indoor environments, in cloudy weather, in heavily treed areas, in cities, and so on. At best a node in such in environment will be able to obtain its required positional information. However, such environments often make communications between a node and the satellites irregular, which may cause a node to fade in and out of the network topology. At worst, a node may never receive its required positional information because it is blocked by environmental conditions that make satellite signal communication with network nodes impossible. In this worst case scenario, a node may become completely superfluous with respect to its role in the network.

Yet another problem, for example, with requiring positional information at each node in a multi-hop network to provide topology control is that technology required to acquire positional information is relatively expensive. Requiring such technology at each node in the network can substantially increase implementation costs of wireless multi-hop networks as well as corresponding maintenance costs.

Accordingly, the following described subject matter addresses these and other problems associated with providing distributed topology control for multi-hop wireless networks.

SUMMARY

The following description provides direction-based topology control to a distributed wireless multi-hop network. The network includes multiple potentially mobile nodes. Each node sends a discovery message in all directions. Each node discovers a set of neighboring nodes using a set of incoming signals from the neighboring nodes that are responsive to the discovery message. Responsive to receiving the incoming messages, each node makes a local decision about a substantially optimal transmission power with which to communicate with at least a portion of the discovered neighboring nodes. The decisions are based on the incoming signals and the decisions are made independent of any positional information (e.g., latitude and longitude). Each node in the network maintains communications with the decided portion of nodes to provide connectivity between each of the nodes.

In contrast to previous approaches that rely on knowing and sharing positional information of the nodes in the network to maintain connectivity in wireless multi-hop networks, the described subject matter provides a solution that relies on incoming directional information in the incoming signals from neighboring nodes. Advantageously, this novel technique increases network lifetime by allowing each node to locally determine an efficient power with which to communicate with specific ones of the other nodes in the network. At the same time this techniques provides for substantial if not complete connectivity with reasonable throughput in a wireless multi-hop network.

The described systems and procedures also include a number of optional enhancements to traditional topology control in wireless multi-hop networks, including, for example, a techniques to reduce signal interference and enhance data throughput.

DETAILED DESCRIPTION

Figure 1:
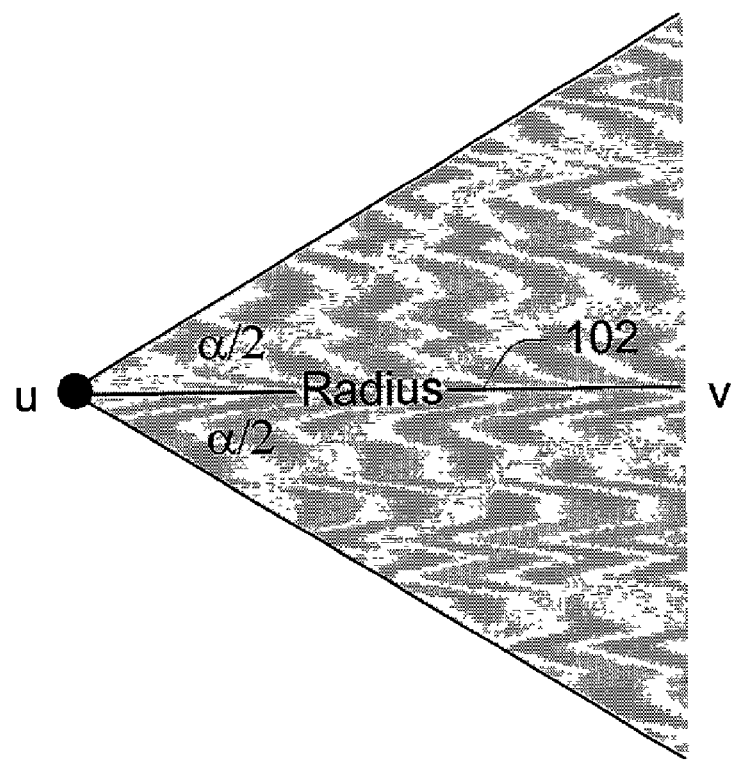
FIG. 1 shows an exemplary cone of coverage of degree α that is centered on node u.

The following description sets forth exemplary subject matter providing distributed topology control to a multi-hop wireless sensor network. The subject matter is described with specificity in order to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Overview

The following description puts forth a new approach to provide distributed topology control to a multi-hop wireless sensor network. Specifically, a novel distributed cone-based topology control algorithm is described that may considerably increase network lifetime and maintain global connectivity with reasonable throughput in a wireless multi-hop network. Network lifetime is affected by determining efficient transmitting radii for each node in the network to communicate with particular ones of the other network nodes. This is accomplished while substantially guaranteeing a same maximum connected node set as when all nodes are transmitting with full power. Additionally, in contrast to previous approaches for topology control in multi-hop networks that require node positional information, the described subject matter provides a solution that uses locally obtained directional information of other nodes to provide topology control to the network.

The distributed cone-based topology control algorithm includes a number of phases, which are summarized as follows. Starting with a small transmission radius, each node (denoted by node u) broadcasts a neighbor-discovery message. Each receiving node acknowledges this broadcast message. Node u records all acknowledgments and the directions they came from. Node u then determines whether there is at least one neighbor in every cone of α degrees, centered on Node u. In this first phase, Node u continues the neighbor discovering process by increasing its transmission radius (operational power) until either the above condition is met or an optimal termination power P (e.g., a power that is less than or equal to the nodes maximum transmission power) is reached. For α smaller than or equal to $5\pi/6$, the algorithm substantially guarantees a maximum connected node set and power efficient connectivity between various node sets.

In an optional second phase, without impacting node connectivity, special and redundant edge removal processes are performed to reduce the node degrees and thereby reduce signal interference and data throughput.

The Topology Control Problem

The topology control problem is formalized as follows: A set V of possibly mobile nodes that are located in the Euclidean 2D plane. Each node u in the set of V is specified by its coordinates, (x(u), y(u)) at any given point in time. Each node u has a power function p where p(d) gives the minimum power needed to establish a communication link to a node v at distance d away from u. Assume that the maximum transmission power P is the same for every node, and the maximum distance for any two nodes to communicate directly is R, i.e. p(R)=P. If every node transmits with power P, then we have an induced graph $G_R=(V, E)$ where $E=\{(u, v) d(u, v) \leq R\}$. $G_R$ is connected. (When the actual network is not connected, $G_R$ is the maximum connected sub-graph.) It is undesirable to have $G_R$ as the network topology for a couple of reasons. First, since the power required to transmit between nodes increases as the nth power of the distance between them, for some n≧2, it may require less power for a node u to relay messages through a series of intermediate nodes to v than to transmit directly to v. In addition, a node can potentially interfere with the transmission of any node w with p(d(u, w))≦P.

Topology control in a wireless multi-hop network is provided with respect to an embedded sub-graph $G_e=(V, E_e)$ such that nodes transmit with smaller amounts of power as compared to traditional systems and techniques for providing topology control, while still substantially guaranteeing that $G_e$ is connected. Additionally, each node has a number of neighbors (i.e., node degree) that is bounded by a small constant to reduce interferences and improve throughput. Moreover, each node u in the network can construct its neighbor set N(u)={v|(u, v) in the set of $G_e$} in a distributed fashion. Furthermore, if $G_R$ changes to $G'_R$ due to node failures or mobility, it is now possible to reconstruct a connected $G'_e$ without global coordination. In other words, it is now possible for each node to respond to failures and mobility issues by coordinating locally with "neighboring" nodes (i.e., other nodes within the node's various cones of coverage), rather than having to involve far away nodes.

To accomplish these aspects of distributed topology control for wireless multi-hop networks and to simplify deployment and reconfiguration upon failures and mobility, a novel cone-based topology control algorithm is presented that utilizes directional information (e.g., north, south, east, and west) in contrast to the positional information (e.g., latitude and longitude) that is typically required in conventional topology control techniques. Additionally, this novel algorithm allows for asynchronous operations between the respective nodes in the distributed wireless multi-hop network. This means that the algorithm does not require all nodes to run the algorithm in a lock-step fashion.

The Basic Cone-Based Topology Control (CBTC) Algorithm

Three communication primitives: broadcast, send and receive, are defined as follows. The primitive $bcast(p_0, m)_u$ is invoked by node u to send message m with power $p_0$ such that all nodes in set S={v|p(d(u, v))≦$p_0$} will receive m; send $(p_0, m)_{u,v}$ is invoked by node u to sent message m to v with power $p_0$; recv $(p_0', m)_{v,u}$ is used by v to receive m with reception power $p_0'$. Note that the reception power $p_0'$ is smaller than the transmission power used by u to send m due to radio signal attenuation in space. In addition, the recv($p_0'$, m)$_{v,u}$ is null if $p_0$<p(d(u, v)). We assume that node v can derive p(d(u, v)) given transmission power $p_0$ and reception power $p_0'$. This assumption is reasonable in practice.

For ease of description, a synchronous model of communication between nodes in the network is first assumed. In a synchronous model, communication is governed by a global clock and proceeds in rounds, with each round taking one time unit. In each round each node u can examine the messages sent to it, compute, and send messages using bcast and send communication primitives. The communication channel is reliable. In later sections, this synchronous model assumption is relaxed, and the correctness of asynchronous executions of the algorithm is discussed.

TABLE 1 illustrates the Basic Cone-Based Topology Control (CBTC) algorithm with a cone degree of α, hereinafter often called the basic CBTC-α algorithm, or the basic algorithm.

TABLE 1

The Basic CBTC-α Algorithm $N_u$ = ∅;  //the neighbor set of u
C = ∅;  //the ordered cone set
$p_u$ = ε;
A = ∅;  //all the newly acquired neighbor IDs
V = ∅;  //the cones formed between u and all the
         //newly acquired neighbor(s).
while ($p_u$ < P){
    $p_u$ = Increase ($p_u$);
    bcast ($p_u$, m)$_u$ and gather ACK responses;
    $N_u$ = $N_u$ ∪ A;
    C' = makeCones (A, V);
    if (computeUnionOfCoverage (C, C') == 2π)
        break;
}

FIG. 1 shows an exemplary cone of coverage 100 of degree α for a node u. The basic operation is for each node u to try to find at least one neighbor in every cone of degree α centered at u.

To accomplish this, each node u starts running the CBTC-α algorithm by sending a node discovery message m in all directions. The message is sent with a small transmission power (e.g., represented by radius 102), which is gradually increased over time to discover more neighbors. Upon receiving the node discovery message m from node u, node v responds with an acknowledgement (ACK) message. Upon receiving the ACK from v, node u records v as a neighbor. Each "acking" neighbor v will help cover "a cone" (e.g., cone 100 of FIG. 1), which centers on node u and spans degree α/2 in each direction. Node u continues to increase its power, thereby increasing its transmission radius 102, until either the union of all discovered node's cone coverages span a circle of 2π, or a substantially optimal terminating transmission radius has been reached.

The following definitions will be used throughout this description. The distance d(u, v) of two nodes u and v is their Euclidean distance. Since power is monotonic in distance, for simplicity, distance is often used rather than power. Significantly, notice that there is no requirement for knowing the global position (e.g., GPS information) of a node, nor is there any exact power function assumption given a certain distance. Node u considers node v as its neighbor when either v responds to u's request or vice versa. Node u maintains a bi-directional edge to particular ones or all of its neighbors, meaning that node u can both send messages to and receive messages from a neighboring node at the other end of the edge.

A circle that centers at u and has radius r is denoted by cir(u, r). Node v is an in-radius neighbor (hereinafter, often referred to as an "i-neighbor") of node u if d(u, v)≦rad(u). Node v is an out-of-radius neighbor (hereinafter, an out-of-radius neighbor is often referred to as an "o-neighbor") of node u if d(u, v)>rad(u). (Note that o-neighbors of u are those neighbors to which u has communicated acknowledgements to respective beacon requests). Given any two nodes u and v, u's facing cone of degree α towards v refers to the shaded area as shown in FIG. 1 and is denoted as cone (u, α, v).

If at the end of performing the cone-based algorithm A node b does not find neighbors to cover all cones of degree α, τηε node b is a boundary node. (Note that with the basic algorithm, the radius of any boundary node is initially the nodes maximum transmission radius.) Let (u, v) denote the edge between the two nodes u and v, and |(u, v)| denote the length of the edge. A path H is an ordered set of consecutive edges $\{(u_0, u_1), (u_1, u_2), (u_2, u_3), \ldots (u_{k-1}, u_k)\}$. A graph, or network topology is connected if there is a path from any node to any other node in the graph. Let $G_r=(V, E_r)$ be the graph after every node finishes the execution of the basic cone-based algorithm.

Cone Degree $\alpha \leq 5\pi/6$ Substantially Guarantees a Connected Graph

For cone degree $\alpha$ up to $5\pi/6$ (i.e., 150 degrees), the local execution of the basic cone-based algorithm at each node collectively guarantees a connected graph. Specifically, any two nodes in $G_R$ that are connected by an edge are connected by a path in $G_r$. Since $G_R$ is connected, $G_r$ must be connected. This demonstrates that cone-based topology control algorithm achieves a connected graph in a power-efficient way.

Lemma 2.1: For $\alpha \leq 5\pi/6$, given any two nodes A and B in $G_r$, if $d(A, B)=d \leq R$ and there is no edge between A and B, there must exist A' and B' with $d(A', B')<d(A, B)$ where A' (B') is either node A (B) itself or one of its i-neighbors.

Proof: The fact that $d(A, B)=d \leq R$, but both rad(A) and rad(B) are less than d implies that A and B must have i-neighbor covering the facing cones cone (A, $\alpha$, B) and cone (B, $\alpha$, A), respectively. The two cases are now distinguished.

$\alpha \leq 2\pi/3$: Node A must have an i-neighbor $A_1$ inside cone (A, $2\pi/3$, B). Clearly, $A_1$ must be inside cir(B, d(A, B)) and so $d(A_1, B)<d(A, B)$. We choose A' to be $A_1$ and B' to be B.

$\alpha>2\pi/3$: If any of A's i-neighbors is/are inside cone(A, $2\pi/3$, B) or vice versa, the same procedures are followed as discussed above to find A' and B'.

Figure 2:
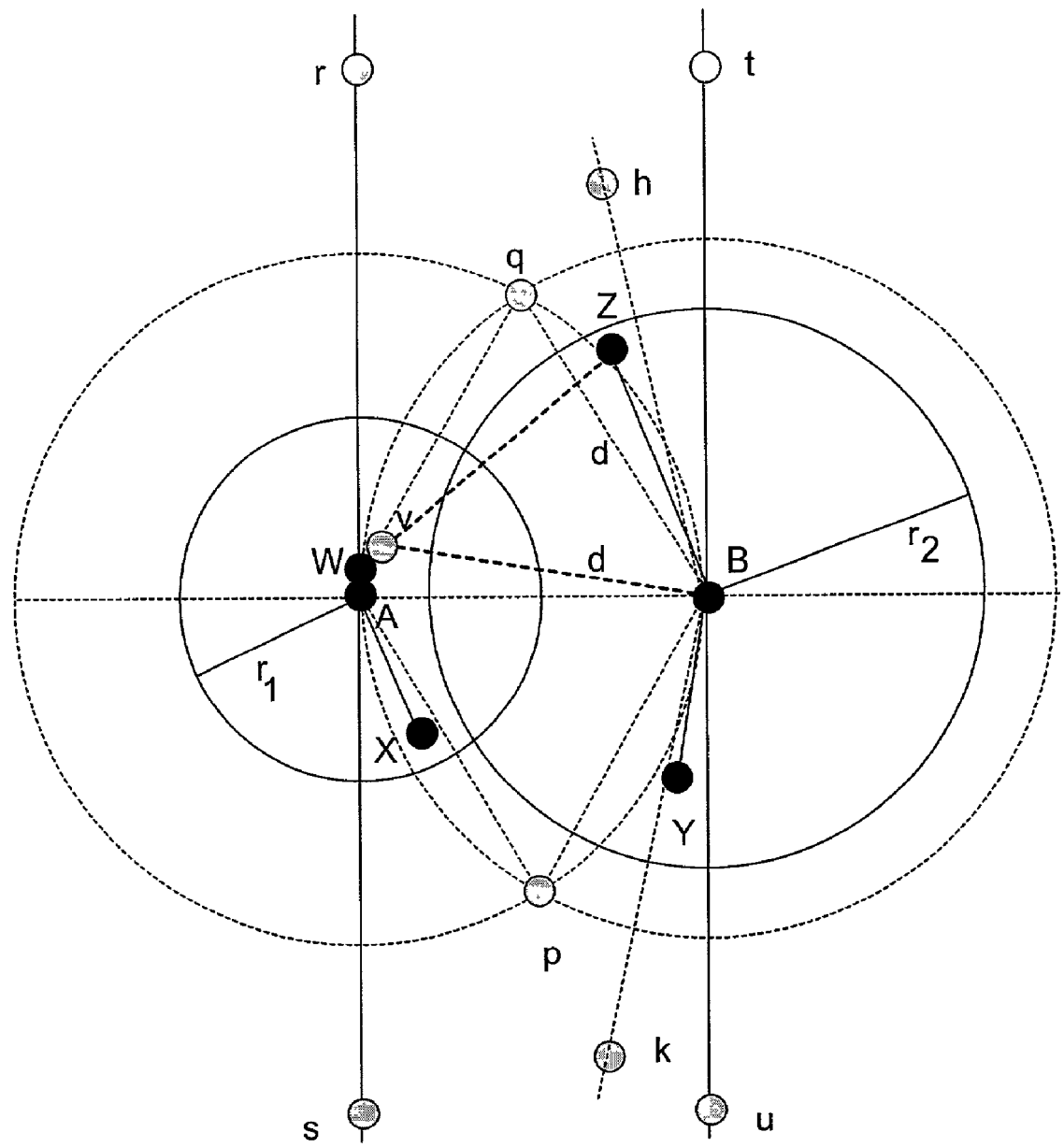
FIG. 2 shows an exemplary proof that a cone degree of $\alpha \leq 5\pi/6$ provides a connected topology control in a wireless multi-hop network.

FIG. 2 shows an exemplary proof for asserting that a cone degree $\alpha \leq 5\pi/6$ provides a connected topology graph of a wireless multi-hop network. Points p and q are the intersection points of cir(A, d) and cir(B, d). Suppose there is no neighbor inside either cone(A, $2\pi/3$, B) or cone(B, $2\pi/3$, A). To cover cone(B, $\alpha$, A), node B must have an i-neighbor within either angle $\angle hBq$ or $\angle kBp$, where h and k are chosen so that cone(B, $\alpha$, A) spans the $\angle hBk$. Without loss of generality, let Z be such a neighbor of B. Points p and q are the intersection points of cir(A, d) and cir(B, d). Line rs and line tu both form $\pi/2$ angles with line AB. If there are multiple such nodes, we choose Z to be the one that has the smallest $\angle ZBA$. Since $\angle ZBu>5\pi/6 \geq \alpha$, there must be another i-neighbor Y of B within the angle $\angle uBp$ to fully cover cone (B, $\alpha$, A). If there are multiple such nodes, Y is selected to be the one with the smallest angle $\angle YBA$. Again, to fully cover cone(B, $\alpha$, A), $\alpha>2\pi/3$, we must have $\angle ZBY \leq \alpha$. We apply the same arguments to node A to find its i-neighbors X and W with $\angle XAW$ $\alpha$. Note that at this point, either X or W can be the counterpart of Z.

In other words:

$$\angle WAB + \angle XAB \leq \alpha \leq 5\pi/6 \tag{1}$$

$$\angle ZBA + \angle YBA \leq \alpha \leq 5\pi/6 \tag{2}$$

Figure 3:
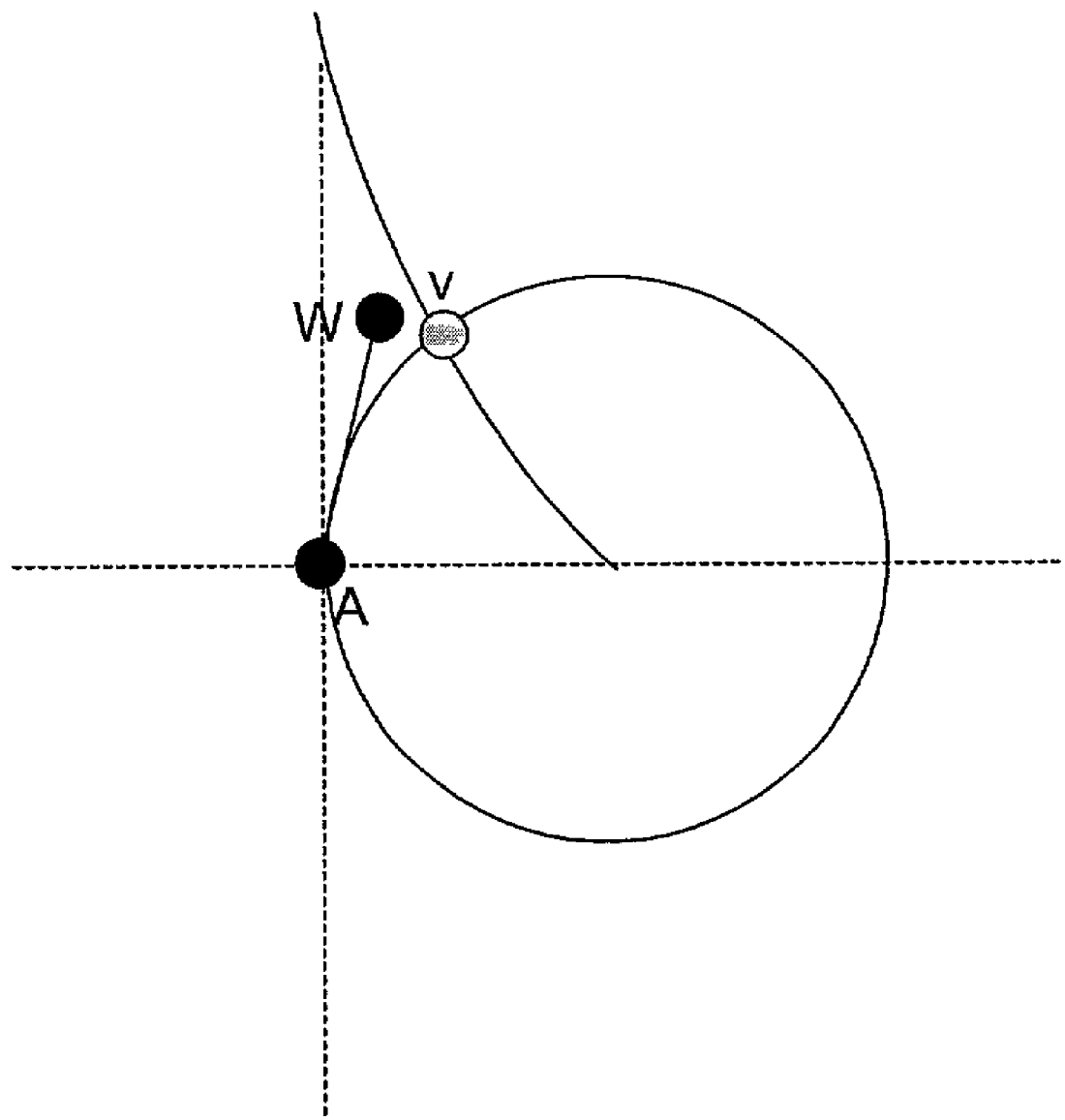
FIG. 3 shows a zoomed in aspect of FIG. 2 to provide an exemplary proof that a cone degree of $\alpha \leq 5\pi/6$ substantially guarantees a connected multi-hop wireless network.

If W is inside cir(B, d), we simply choose W and B to be the new node pair. So we consider only $d(W, B) \geq d$ for the rest of the proof. Similarly, we have $d(X, B) \geq d$, $d(Y, A) \geq d$, and $d(Z, A) \geq d$. We now prove, by contradiction, that d(W, Z) and d(X, Y) cannot both be greater than or equal to d. The pair of nodes with distance less than d is chosen to be A' and B'. Suppose $d(W, Z) \geq d$ and $d(X, Y) \geq d$. Let v be the intersection point of cir(Z, d) and cir(B, d). Node W must be outside (or on) both circles (Z, d) and cir(B, d), and $\angle WAB \geq \angle vAB$ as shown in FIG. 3.

Since $d(v, Z)=d(v, B)+d(A, B)=d$, and $d(Z, B)<d$ and hence $\angle ZBv>\pi/3$, we have $$\angle vBA = \angle ZBA - \angle ZBv < \angle ZBA - \pi/3, \tag{3}$$

$$\angle vBA = \pi - 2 * \angle vAB. \tag{4}$$

Accordingly, $$\angle ZBA - \pi/3 > \pi - 2 * \angle vAB, \quad \angle vAB > 2\pi/3 - \angle ZBA/2,$$

$$\angle WAB > 2\pi/3 - \angle ZBA/2. \tag{5}$$

By definition of Z, $\angle ZBA \leq \alpha/2 \leq 5\pi/12$ and so $\angle WAB > 2\pi/3 - 5\pi/24 = 11\pi/24 > \alpha/2$. Therefore, W is not the counterpart of Z on the A side, and so X must be Z's counterpart. By replacing $\angle ZBA$ with $\angle XAB$ and $\angle WAB$ with $\angle YBA$, we have:

$$\angle YBA > 2\pi/3 - \angle XAB/2. \tag{6}$$

From Equation 5 and 6, we have:

$$\angle WAB + \angle XAB > (2\pi/3 - \angle ZBA/2) + (4\pi/3 - 2*\angle YBA) = 2\pi - \angle ZBA/2 - 2*\angle YBA. \tag{7}$$

Combine Equation (7) with Equation (1), and we have $5\pi/6 > 2\pi - \angle ZBA/2 - 2*\angle YBA$ and $4*\angle YBA + \angle ZBA > 7\pi/3$. Combine that with Equation 2, we have $3*\angle YBA > 3\pi/2$ and $\angle YBA > \pi/2$, contradicting the fact that Y is inside $\angle uBp$.

Lemma 2.2: For $\alpha \leq 5\pi/6$, given any two nodes A and B in $G_r$, if $d(A, B)=d \leq R$ and there is no edge between A and B, there must exist a path H between A and B.

Proof: Given nodes A and B, we apply Lemma 2.1 recursively to find node pairs with monotonically decreasing distances, and stop when a node pair is connected by an edge. This stopping condition is guaranteed to eventually happen because one does not find a node pair with distance less than L, the shortest distance among all node pairs in V. Connecting A and B constructs the path H through the nodes of the node pairs found in the process.

Theorem 2.3: Cone-based algorithm with degree $\alpha$, $\alpha \leq 5\pi/6$, substantially guarantees a connected graph; that is, graph $G_r$ is connected.

Proof: Given any edge (A, B) in $G_R$, we must have $d(A, B) \leq R$. If the edge does not exist in $G_r$, A and B must be connected by a path according to Lemma 2.2. Since $G_R$ is connected, $G_r$ must be connected.

A Cone Degree of $5\pi/6$ is an Upper Bound

Theorem 2.4: Cone-based algorithm with degree $\alpha$, where $\alpha>5\pi/6$, does not guarantee a connected graph.

Proof: A counter example is constructed for any $\alpha=5\pi/6+\epsilon$, $\epsilon>0$. It suffices to prove the theorem only for an arbitrarily small $\epsilon$ because the same counter example constructed also satisfies the angle constraints for any larger $\epsilon$.

Figure 4:
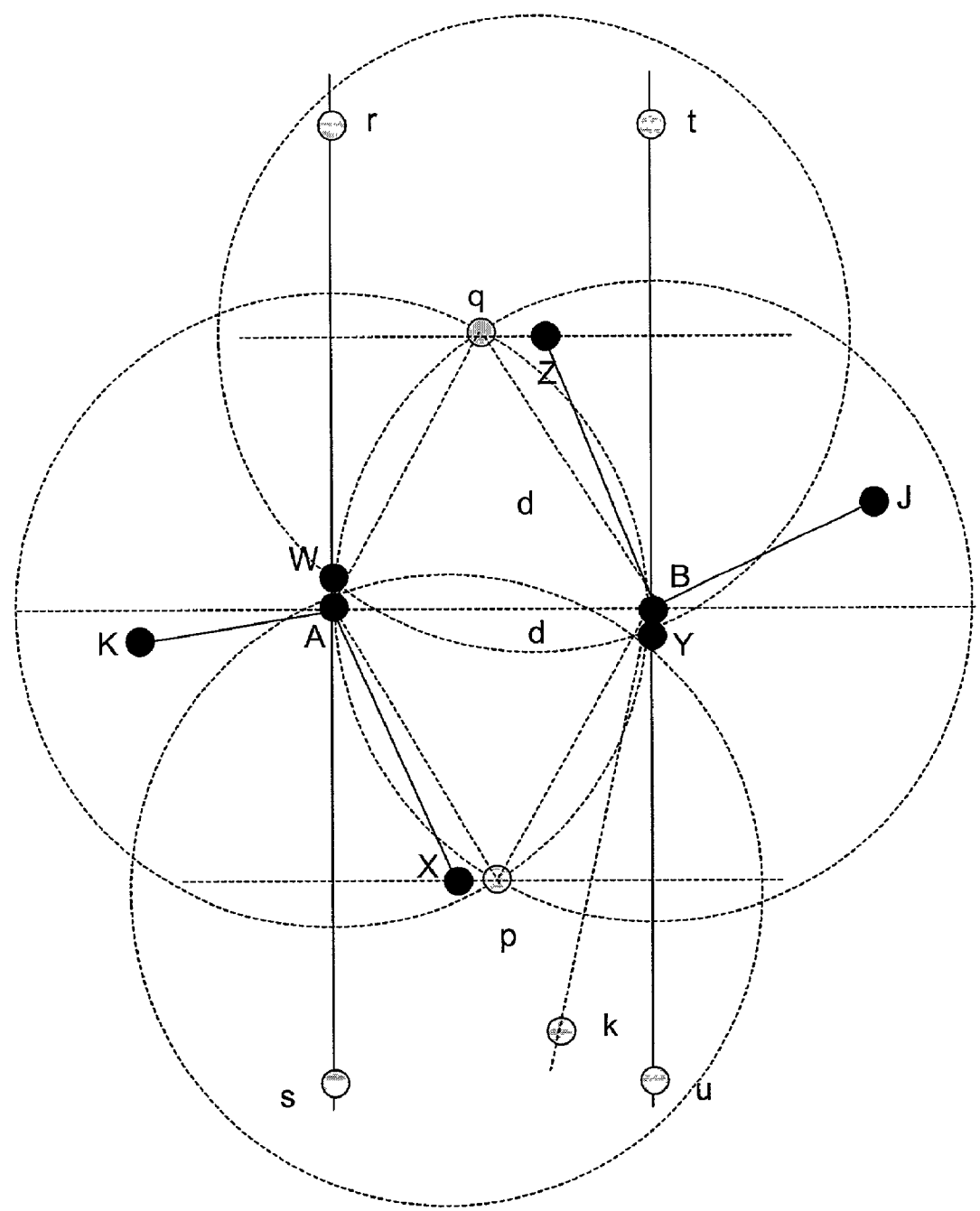
FIG. 4 shows a number of wireless multi-hop network nodes for which a cone-based topology algorithm using a cone degree of $\alpha > 5\pi/6$ does not guarantee a connected multi-hop wireless network.

FIG. 4 shows a disconnected topological graph of network nodes, wherein a cone degree of $\alpha=5\pi/6+\epsilon$ is used to determine if there are neighboring nodes covering the cones. All circles of FIG. 4 have radius R, and only black points marked by capital letters are actual nodes. Specifically, FIG. 4 illustrates the basic shape of the counter example: the distance between node A and node B is set to be R. So $G_R$ is connected.

In Gr, the sub-graph on the left-hand side consists of nodes A, W, X, and K and edges AW, AX, and AK (hereinafter, referred to as A-star sub-graph), will be shown to be disjoint from a similar B-star sub-graph that is illustrated in FIG. 4. Circles (B,R) and (A,R) intersect at points q and p. Lines rs and tu are both orthogonal to line AB. Nodes Z and X are chosen based on the given $\epsilon$, which is to be described shortly. Node W' (See FIG. 6) is at the intersection of circle (Z,R) and line rs. Similarly, node Y' (not shown) is at the intersection of (XR) and line tu. Finally, we choose nodes K and J so that ∠WAK=∠YBJ=7π/12 and length AK=BJ=R/2.

Figure 5:
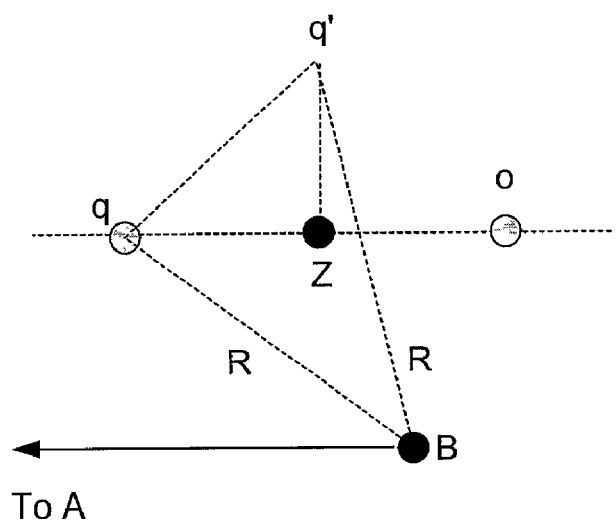
FIG. 5 illustrates a zoomed in portion of FIG. 4 to provide a "B-star" sub-graph that is shown to be disjoint from an A-star sub-graph of FIG. 4. Specifically, FIG. 5 further shows that using a cone degree of $\alpha > 5\pi/6$ in the cone-based topology algorithm does not guarantee a connected multi-hop wireless network.

Given an arbitrarily small angle of degree ε (ε<π/6), we choose node Z as follows. Referring to FIG. 5 (a zoomed in portion of FIG. 4), we choose point q' on the circle (B,R) so that the angle ∠qBq' is of degree ε. Draw a line qo that is parallel to AB. Since ∠oqB=∠qBA=π/3, we have ∠q'qo= (π−ε)/2−π/3=π/6−ε/2>0. We choose Z on line qo so that ∠q'Zq=π/2. Clearly, we have length ZB<R and ZA>qA=R. So node W' (with ZW'=R by definition) must be located above node A. We choose node W to be halfway between A and W' so that WZ>R. Node X is similarly chosen so that XA<R, XB>R, and node Y is located halfway between B and Y'.

Figure 6:
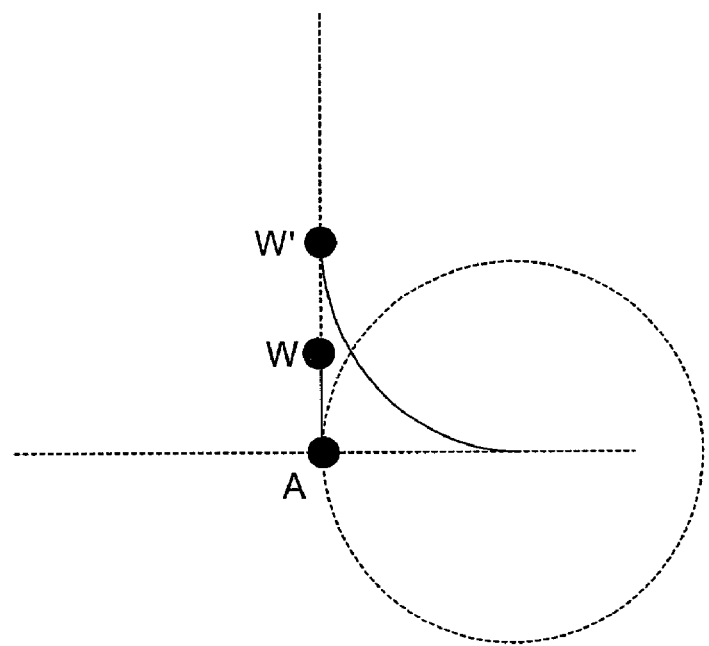
FIG. 6 illustrates a zoomed in portion of FIG. 4 to show that a cone coverage of $\alpha = 5\pi/6 + \in$ may result in a disjoint topology of the network nodes.

Now we consider the execution of the cone-based algorithm with α=5π/6+ε, ε>0, at every node in FIG. 4 by referring also to FIGS. 5 and 6. Node B stops the execution at radius ZB<R because ∠ZBY<∠q'Bu=5π/6+ε and ∠ZBJ<∠qBJ=7π/12=∠JBY<5π/6+ε. Node W stops only when reaching radius R because it is more than distance R away from any node of B-star. Nodes X and K also stop at radius R for the same reason. Same arguments apply to nodes of B-star. Therefore, A-star and B-star are disjoint after each node finishes running the cone-based algorithm with a cone degree of α=5π/6+ε.

Accordingly, the cone-based algorithm with degree α, α>5π/6, may result in a disconnected graph Gr as shown in FIG. 4, and hence does not guarantee a connected graph.

Optimizations to the Basic Algorithm

In this section, three optimizations to the basic algorithm are described: a shrink-back operation, special edge removal, and pair-wise edge removal. These optimizations do not disconnect Gr, but rather preserve a connected graph while potentially reducing a node's transmission power and interference (thereby potentially increasing data throughput in the network).

The Shrink-back Operation

In the basic algorithm, all boundary nodes stay with the maximum radius R after failing to find i-neighbors to cover all cones. A shrinking phase at the end of the growing phase is to allow each boundary node to shrink back its radius until any further shrinking would reduce the overall cone coverage.

Such shrink-back operation allows a boundary node to exclude those i-neighbors that it has unnecessarily acquired as part of a failed attempt to find i-neighbors in other directions. After a boundary node locally determines the new radius that it should shrink back to, it sends a neighbor revocation beacon to those i-neighbors that are no longer inside its newly determined radius and decreases its transmitting power accordingly. We prove in the following theorem that the shrink-back operation does not disconnect Gr.

Definition 3.1: Let Gs=(V, $E_s$) be the graph after every node finishes the execution of the basic cone-based algorithm and the shrink-back operation.

Theorem 3.2: For α≦5π/6, the basic cone-based algorithm with the shrink-back optimization still substantially guarantees a connected graph.

Proof: Given any two nodes A and B in $G_s$, if d(A, B)=d≦R and there is no edge between A and B, either both A and B never reached radius d in the growing phase or one or both of them reached d and then shrunk back past d. In either case, nodes A and B must still have i-neighbors fully covering the cones cone(A, α, B) and cone(B, α, A), respectively, because any shrink-back operation can only remove those i-neighbors that provide redundant cone coverage. Therefore, the proofs of Lemma 2.1, Lemma 2.2, and Theorem 2.3 are all still valid, and Gs is connected.

Special Edge Removal

Maintaining o-neighbors is undesirable in practice because such neighbors may require special treatments in broadcast operations. For example, suppose node u has a very small radius rad(u), but has one o-neighbor v with d(u, v) close to R. To send a broadcast message m, node u can send the message using bcast(p(rad(u)),m)$_u$ to reach all i-neighbors, but must send a separate message with a much larger power to reach v using send(p(d(u, v)),m)$_{u,v}$.

Definition 3.3: An edge (u, v) is called a special edge if u is an i-neighbor of v but v is an o-neighbor of u, or vice versa. We denote the edge as se(v, u) for the former case, and se(u, v) for the latter.

In this section, we prove that, for α≦2π/3, all special edges can be removed without disconnecting the graph. We also show that special edges can not be removed for any α, 2π/3<α≦5π/6, by demonstrating the procedure for constructing counter examples in which removing a special edge would disconnect the graph. The following lemma is an extension of Case 1 in the proof of Lemma 2.1.

Lemma 3.4: For α≦2π/3, given any two nodes u and v with d(u, v)≦R, if rad(u)<d(u, v), there must exist a path H between u and v consisting of edges ($u_0$, $u_1$), ($u_1$, $u_2$), ($u_2$, $u_3$), . . . , ($u_{k−1}$, $u_k$) ($u_0$=u and $u_k$=v), which have the following properties for all i=1, . . . , k:

$u_i$ is an i-neighbor of $u_{i−1}$;

d($u_{i−1}$, $u_i$)<d(u, v); that is, all edges on H are shorter than d(u, v); and, d($u_i$, v)<d($u_{i−1}$, v); that is, $u_i$ is closer to v than $u_{i−1}$.

Figure 7:
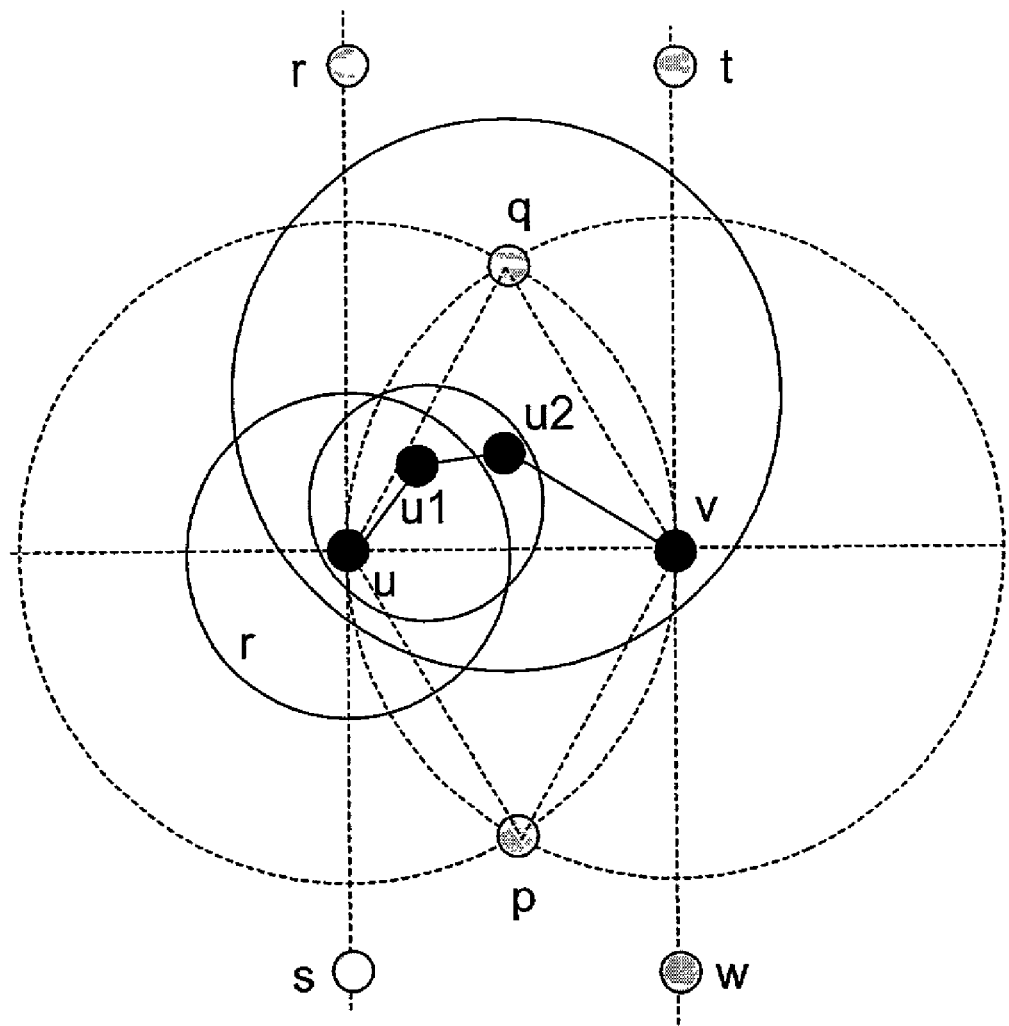
FIG. 7 shows that for cone degree of $\alpha \leq 2\pi/3$, all special edges in a wireless multi-hop network can be removed without resulting in a disjoint, or disconnected network topology—an edge (u, v) is called a special edge if node u is an i-neighbor of node v, but node v is an o-neighbor of u, or vice versa.

FIG. 7 shows that for cone degree of α≦2π/3, all special edges in a wireless multi-hop network can be removed without disconnecting the topological graph—an edge (u, v) is called a special edge if u is an i-neighbor of v but v is an o-neighbor of u, or vice versa. (All dotted circles in FIG. 7 have radius d). Because rad(u)<d(u, v) implies that there exists an i-neighbor $u_1$ of u within the 2π/3 ∠qup. Therefore, cone(u,α,v) can be covered. Clearly, d(u, $u_1$)≦rad(u)<d(u, v) and d($u_1$, v)<d(u, v).

Applying the same argument iteratively on the intermediate node pair $u_{i−1}$ and v, we have (1) $u_i$ is an i-neighbor of $u_{i−1}$ and (2) d($u_{i−1}$, $u_i$)≦rad($u_{i−1}$)<d($u_{i−1}$, v)< d($u_{i−2}$, v)< . . . <d(u, v). Since d($u_i$, v) is monotonically decreasing and there is a lower bound L on the inter-node distance, we must eventually reach a $u_{k−1}$ that includes v as an i-neighbor to complete the path H.

Theorem 3.5: For α≦2π/3, all special edges can be removed without disconnecting the graph.

Proof: A path consisting of only non-special edges must also connect every pair of nodes that are connected by a special edge. So all special edges can be removed without disconnecting the graph. All of the special edges are sorted based on their lengths in non-decreasing order and denoted as $e_1,e_2, \ldots, e_m$, where $|e_i|≦|e_i+1|$ and m is the total number of special edges.

By induction, every special edge $e_k$=se($v_k$, $u_k$) has a corresponding path H'$_k$, which connects $v_k$ and $u_k$ and consists of only non-special edges. Examining $e_1$=se($v_1$, $u_1$) where rad($u_1$)<d($u_1$, $v_1$), from Lemma 3.4, there must exist a path $H_1$ between $u_1$ and $v_1$, which consists of only edges that are shorter than $|e_1|$. Since $e_1$ is the shortest among all special edges, all edges on $H_1$ must be non-special edges. Let H'$_1$=$H_1$ and we have the induction step k=1.

Suppose, for every $e_j=se(v_j, u_j)$, $1 \leq j \leq i-1$ we have found a path $H'_j$ between $u_j$ and $v_j$, which consists of only non-special edges. Now we consider $e_i=se(v_i, u_i)$, the induction step k=i. From Lemma 3.4, there exists a path $H_i$ between $u_i$ and $v_i$. If $H_i$ contains any special edge $e_j$, we must have $j \leq i-1$. Replacing every such $e_j$ with its corresponding $H'_j$ yields a path $H'_i$ that connects $u_i$ and $v_i$ through only non-special edges.

Now all special edges can be removed without disconnecting any of the $H'_k$'s edges. So the graph remains connected.

Theorem 3.6: For $2\pi/3 < \alpha \leq 5\pi/6$, performing special edge removal may disconnect the graph.

Figure 8:
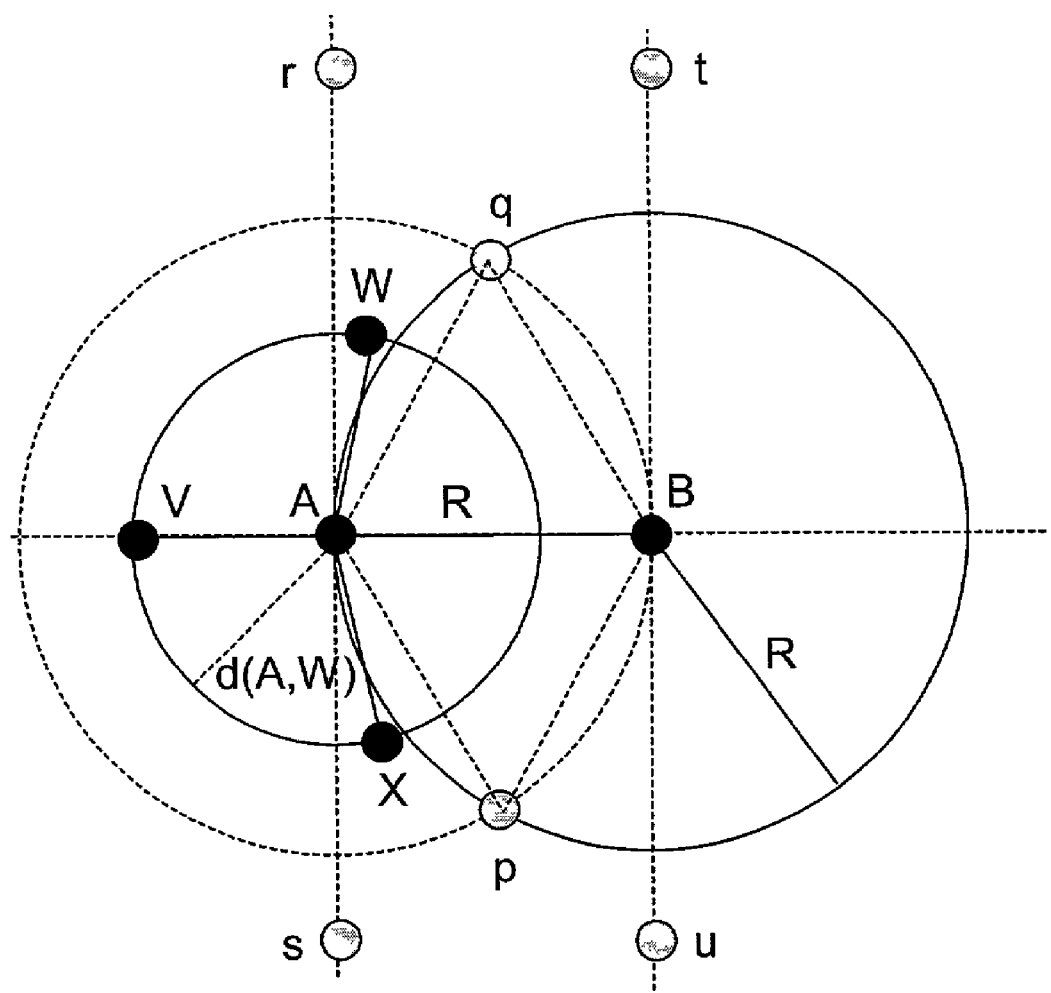
FIG. 8 is a diagram that is used to show that performing special edge removal for cone degrees where $2\pi/3 < \alpha \leq 5\pi/6$ may disconnect nodes in the wireless multi-hop network.

Proof: FIG. 8 is a diagram that is used to show that for cone degrees where $2\pi/3 < \alpha \leq 5\pi/6$, performing special edge removal may disconnect the graph. Given any $\alpha = 2\pi/3 + \epsilon$, $2\pi/3 < \alpha \leq 5\pi/6$, we demonstrate the procedure for constructing the counter example shown in FIG. 8, in which se(B,A) is a special edge and removing se(B,A) would disconnect the graph. Let d(A,B)=R. Position W so that $\angle WAB = \pi/3 + \epsilon/2$ and $\angle BWA = \angle BqA = \pi/3$. Since $\angle WBA = \pi/3 - \epsilon/2 < \angle BWA < \angle WAB$, we have d(A, W)<d(A,B)<d(B, W). Position X in a similar way, and we have $\angle WAX = \alpha$. Finally, let $d(A, V) \leq d(A, W)$.

The cone-based algorithm is executed with shrink-back optimization on every node. Node A stops at rad(A)=d(A, W). Nodes W, X, and V are boundary nodes, and each of them grows its radius to R and then shrinks back. Since d(B,X)=d(B, W)>d(A,B)=R and d(B, V)>R, none of them can reach node B. Node B grows its radius to R, obtains A as its i-neighbor, and stays at rad(B)=R. Clearly, se(B,A) is a special edge and the graph in FIG. 8 is connected. Removing se(B,A) would, however, disconnect node B from the rest of the graph.

The basic cone-based algorithm with shrink-back optimization is enhanced so that each node can locally detect and remove special edges for $\alpha \leq 2\pi/3$. For any se(B,A), node A can detect that se(B,A) is a special edge simply by observing that rad(A)<d(A,B). However, node B may not be able to determine that because it does not know whether node A has finished its execution of the algorithm or not. To supply that information, the algorithm is enhanced as follows. Upon acknowledging a beacon request from B, node A includes B in its o-neighbor set unless B is already an i-neighbor of A. After A finishes the basic algorithm and the shrink-back operation, A sends rad(A) to all the nodes in the o-neighbor set.

Pair-wise Edge Removal

Another optimization aims at further reducing the number of neighbors for each node and places an upper bound on the node degree. Each node is assigned a unique ID, which is included in messages from the node. Given any pair of node u neighbors such as node v and node w, node u determines which of them is closer as follows.

Recall that node u grows its radius in discrete steps. It includes its transmission power level in each beacon request so that the receivers can use the same power to respond to reach node u. A node that responds to u's request in an earlier step is clearly closer to u than those that respond in later steps. If v and w both respond to u's request with power level p'(u) and w's response has a lower power level when it is received by u, then we must have d(u,w)>d(u,v).

We now define edge IDs and the notion of redundant edge.

Definition 3.7: Each edge (u, v) is assigned an edge ID eid(u, v)=$(i_1, i_2, i_3)$ where $i_1$=d(u, v), $i_2$=max(node IDs of u and v), and $i_3$=min(node IDs of u and v). Comparison of two edge IDs is based on the lexicographical order.

Definition 3.8: Given any $\theta \leq \pi/3$ and given any pair of edges (u, v) and (u,w) such that $\angle vuw < \theta$, if eid(u, v)>eid(u,w), then (u, v) is called a redundant edge. (Note that the $\pi/3$ upper bound on $\theta$ is to make sure that, if edge (v,w) exists, it is not longer than both (u, v) and (u,w).)

Depending on the metrics to optimize, a redundant edge may or may not be removed. We call the optimization that removes all redundant edges the pair-wise edge removal optimization.

Theorem 3.9: For $\alpha \leq 2\pi/3$, all redundant edges can be removed without disconnecting the graph. Proof. Every pair of nodes that are connected by a redundant edge must also be connected by a path consisting of only edges that are not redundant edges in any pair of edges of a node. So all redundant edges can be removed without disconnecting the graph. Given all the edges, each is a redundant edge in at least one pair of edges, we sort them based on their edge IDs in non-decreasing order and denote them $e_1, e_2, \ldots, e_m$, where $|e_i| \leq |e_{i+1}|$ and m is the total number of redundant edges.

Figure 9:
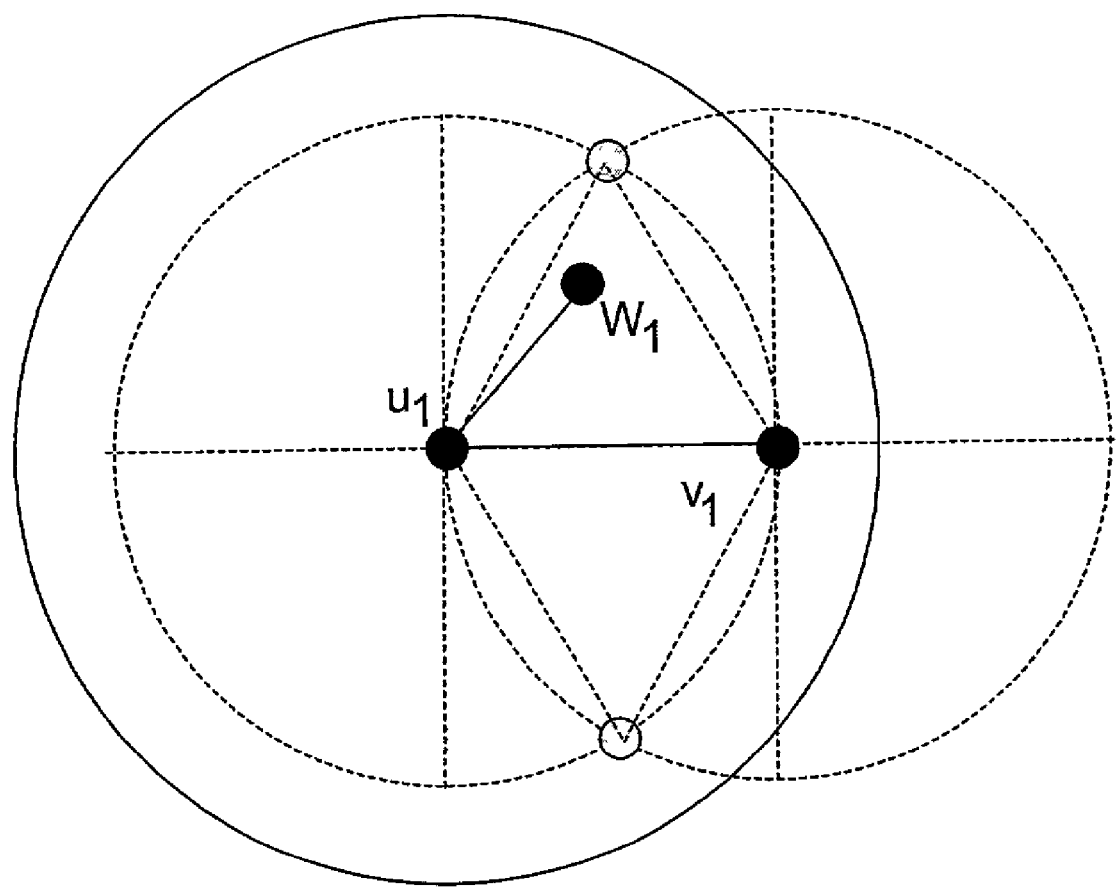
FIG. 9 is an illustration for the pair-wise edge removal theorem, which is used to remove a redundant edge from a wireless multi-hop network topology.

By induction, every redundant edge $e_k = (u_k, v_k)$ has a corresponding path $H'_k$, which connects $u_k$ and $v_k$ and contains no redundant edges. Examining $e_1 = (u_1, v_1)$, by definition there must exist an edge $(u_1, w_1)$ such that $\angle v_1 u_1 w_1 < \theta \leq \pi/3$ and eid$(u_1, v_1)$>eid$(u_1, w_1)$, as shown in FIG. 9, which is an illustration for the pair-wise edge removal theorem, and wherein $\angle v_1 u_1 w_1 < \pi/3$, wherein edge $(u_1,v_1)$ is a redundant edge.

Since $e_1$ is the redundant edge with the smallest edge ID, $(u_1, w_1)$ is not a redundant edge. The fact $\angle v_1 u_1 w_1 < \pi/3$ implies that the distance between $v_1$ and $w_1$ must be shorter than $d(u_1, v_1)$. If edge $(w_1, v_1)$ exists, the edge is not be a redundant edge, and so $H'_1$ includes $(u_1, w_1)$ and $(w_1, v_1)$. If there is no edge between $v_1$ and $w_1$, since $d(v_1, w_1) < d(u_1, v_1) \leq R$ and $\alpha \leq 2\pi/3$, there must exist a path $H_1$ between $v_1$ and $w_1$, which consists of only edges shorter than $d(v_1, w_1)$, according to Lemma 3.4. Clearly, no edges on $H_1$ can be a redundant edge and so we can connect $(u_1, w_1)$ with $H_1$ to obtain $H'_1$, thus finishing the induction step k=1.

Suppose, for every $e_j=(u_j, v_j)$, $1 \leq j \leq i-1$, we have found a path $H'_j$ between $u_j$ and $v_j$, which contains no redundant edge. Now we consider $e_i=(u_i, v_i)$, the induction step k=i. By definition, there exists another edge $(u_i, w_i)$ with eid$(u_i, v_i)$>eid$(u_i, w_i)$ and $\angle v_i u_i w_i < \pi/3$. If $(u_i, w_i)$ is a redundant edge, it must be one of $e_j$'s, where $j \leq i-1$. If the path $H_i$ (from Lemma 3.4) between $v_i$ and $w_i$ contains any redundant edge $e_j$, we must have $|e_j| < |e_i|$ and so $j \leq i-1$. By connecting $(u_i, w_i)$ with $H_i$ and replacing every redundant edge $e_j$ on the path with $H'_j$, a path $H'_i$ between $u_i$ and $v_i$ is obtained, which contains no redundant edges.

Thus all redundant edges are removed without disconnecting any of the $H'_k$'s, and the graph remains connected.

Theorem 3.10: Pair-wise edge removal with $\theta \leq \pi/3$ places an upper bound of $2\pi/\theta$ on the node degree.

Proof by contradiction: Suppose there is a node that has n neighbors, where n>$2\pi/\theta$ after pair-wise edge removal. Let $\beta$ be the smallest angle between any pairs of edges. We must have $\beta \leq 2\pi/n < \theta$. By definition, one of the edges for the $\beta$ angle must be a redundant edge and should have been removed. Thus, there is a contradiction. Therefore, pair-wise edge removal with $\theta \leq \pi/3$ places an upper bound of $2\pi/\theta$ on the node degree.

Network Reconfiguration, Node Failures, and Asynchrony

In a multi-hop wireless network, nodes can be mobile. Even if a node does not move, a node may cease operations if it runs out of energy stores. Additionally, a new node may be added to the network. Such events may change overall the network's topology, or configuration. To manage such changes in a wireless multi-hop network, each node periodically communicates a "still alive" message, or beaconing message to neighboring nodes to indicate that the communicating node is operational. Any one of a number of different protocols such as the Neighbor Discovery Protocol (NDP) can be used for such communications.

Each beacon message includes a set of information corresponding to the communicating node such as the communicating node's ID and the transmission power of the beacon. A neighbor node is considered failed if a pre-defined number of beacons from the node are not received within a particular amount of time $\tau$. A node v is considered a new neighbor of u if a beacon is received from v and no beacon was received from v during a previous time $\tau$ interval (this interval may or may not be the same as the time $\tau$ that it takes to determined that a node has failed).

A node u broadcasts, or beacons with sufficient power to reach all of its neighbors in $N_u$ for reconfiguration based on the basic cone-based algorithm. Specifically, if node u beacons with power $p^b_u$ where $p^b_u$ is the power that u must use to reach all its neighbors in $N_u$, (including i-neighbors and o-neighbors)—$p^b_u \geq p(rad(u))$, which is the power to reach all i-neighbors, then this is sufficient power to beacon using the basic cone-based algorithm. (Such beaconing can be combined with asymmetric edge removal if $\alpha \leq 2\pi/3$, in which case power $p_u$ is used).

Three basic network reconfiguration indicating events are defined as follows:

A $join_u(v)$ event happens when node u detects a beacon from node v for the first time;

A $leave_u(v)$ event happens when node u misses some predetermined number of beacons from node v;

An $angleChange_u(v)$ event happens when u detects that v's angle with respect to u has changed. (Note this could be due to movement by either u or v.)

The reconfiguration algorithm: It is assumed that each node is tagged with the power used when it was first discovered, as discussed above with respect to the shrink-back operation. (This assumption is not necessary, but it minimizes the number of times that CBTC needs to be rerun). If a $leave_u(v)$ event happens, and if the union of the cone coverage reduces after dropping the cone(u,$\alpha$,v) from the set of cones C, node u reruns CBTC-$\alpha$, starting with power $p^b_u$.

If a $join_u(v)$ event happens, u computes its cone(u,$\alpha$,v) and the power needed to reach v. As in the shrink-back operation, u then removes nodes, starting with the farthest neighbor nodes and working back, as long as their removal does not change the coverage.

If an $angleChange_u(v)$ event happens, node u modifies the cone(u,$\alpha$,v) in the cone set C. The cone coverage reduces, then CBTC-$\alpha$ is rerun, again starting with power $p^b_u$. Otherwise, nodes are removed, as in the shrink-back operation, to see if less power can be used.

There may be more than one change event that is detected at a given time by a node u. For example, if u moves, then there will be in general several leave, join and angleChange events detected by u. If more than one change event is detected by u, changes discussed above are performed as if the events are observed in some order, as long as there is no need to rerun CBTC. If CBTC needs to be rerun, node u deals with all changes simultaneously.

The reconfiguration algorithm substantially guarantees that each cone of degree $\alpha$ around a node u is covered (except for boundary nodes), just as the basic algorithm does. However, frequent network topology changes may cause the actual connectivity in the network to be in a state of flux. Yet, if changes within the network stabilize, or cease for some amount of time, then the reconfiguration algorithm may catch up with the changes and subsequently maintain connectivity of the stabilized network. The proof that the reconfiguration algorithm maintains connectivity follows immediately from the proof of Theorem 2.3.

This reconfiguration algorithm works in combination with the basic algorithm CBTC-$\alpha$ and in combination with the asymmetric edge removal optimization. Yet combining the reconfiguration algorithm with the shrink-back and/or the pair-wise edge removal optimizations requires additional beacon transmission power considerations.

To illustrate an additional power consideration, consider that if the shrink-back operation is performed, using the power to reach all the neighbors in $G_s$ does not suffice. Suppose that the network is temporarily partitioned into two sub-networks $G_1$ and $G_2$; for every pair of nodes $u_1 \in G_1$ and $u_2 \in G_2$, the distance $d(u_1,u_2)>R$. Suppose that $u_1$ is a boundary node in $G_1$ and $G_2$ is a boundary node in $G_2$, and that, as a result of the shrink-back operation, both $u_1$ and $u_2$ use power P'<P. Further suppose that later nodes $u_1$ and $u_2$ move closer together so that $d(u_1,u_2)<R$. If P' is not sufficient power for $u_1$ to communicate with $u_2$, then they will never be aware of each other's presence, since their respective beacons will not reach each other—thus they will not detect that the network has become reconnected. In this illustration network connectivity is not preserved. This problem is solved by having the boundary nodes broadcast with the power P computed by the basic CBTC-$\alpha$ algorithm.

In yet another example of a power consideration, consider that with the pairwise edge removal optimization, it is necessary for u's beacon to broadcast with the power needed to reach all of u's neighbors in the basic CBTC-$\alpha$, not just the power needed to reach all of u's neighbors after the optimization is performed. This choice of beacon power guarantees that the reconfiguration algorithm works in combination with the optimization.

The reconfiguration protocol works in an asynchronous setting. In particular, the synchronous model with reliable channels (assumed until now) is relaxed to allow asynchrony and both communication and node failures. Now nodes are assumed to communicate asynchronously, messages may get lost or duplicated, and nodes may fail (although we consider only crash failures: either a node crashes and stops sending messages, or it follows its algorithm correctly). At any given time, each node u can examine the messages sent to it, compute, and send messages using, for example, either the bcast or send primitives.

A limited loss model is assumed where a message will be received infinitely many times if it is sent infinitely many times, message delay is bounded for transmissions that are not lost, and messages have unique identifiers and mechanisms to discard duplicate messages are present. The faulty behavior of nodes can only be stopping failure. Messages have unique identifiers and that mechanisms to discard duplicate messages are present. Node failures result in leave events, as do lost messages. If node u gets a message after many messages having been lost, there will be a join event corresponding to the earlier leave event. The asynchronous exchange algorithm works correctly in this relaxed model.

To illustrate this, consider that even if a node v fails to receive a beacon request message from u, it will eventually receive u's the periodic NDP beacon message. Based on the transmission power pm and reception power pm' of the beacon, the power $p(d(u, v))$ can be derived. Firstly, consider the basic CBTC algorithm. If there is no failure or mobility after a specific time t, each node u will construct the same neighbor set N(u) as the one in the synchronous model. Therefore, the algorithm will eventually construct the same connected embedded graph Gr as the one in the synchronous model.

For an algorithm with special edge removal, even if the revocation message from u to an o-neighbor v is lost, node v will eventually remove se(v, u) since v will not receive u's periodic beacon message m sent by bcast(p(rad(u)),m)u and will eventually consider u failed.

Energy Efficiency of Control Traffic

Since topology control protocol itself consumes power, it is substantially beneficial to keep the power consumption of topology control protocol small. The energy efficiency for the basic cone-based algorithm depends on the algorithm implemented in Increase(p) as shown above in Table 1. The simplest solution is to beacon with the maximum power P once. However, this could take excessive power.

Assume that p(u) is the optimal terminating power for the basic cone-based algorithm, if the beacon power is doubled every time, then the terminating power p(rad(u)) is bounded by 2p(u). Thus this simple scheme achieves a 2-competitive solution in terms of the optimal Increase(p) function (the optimal solution is to beacon once using p(u) assuming a reliable channel.

Experimental Results

Figure 10:
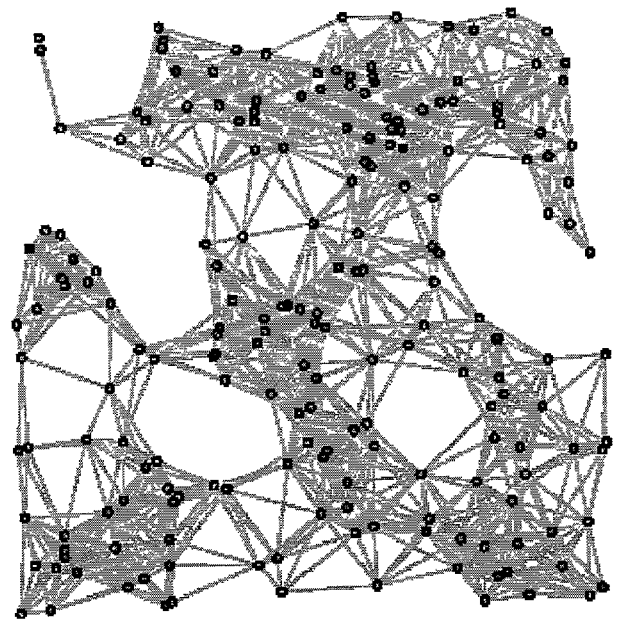
FIG. 10 shows a topology graph of a wireless multi-hop network wherein no topology control is employed and every node transmits with the maximum power.
Figure 11:
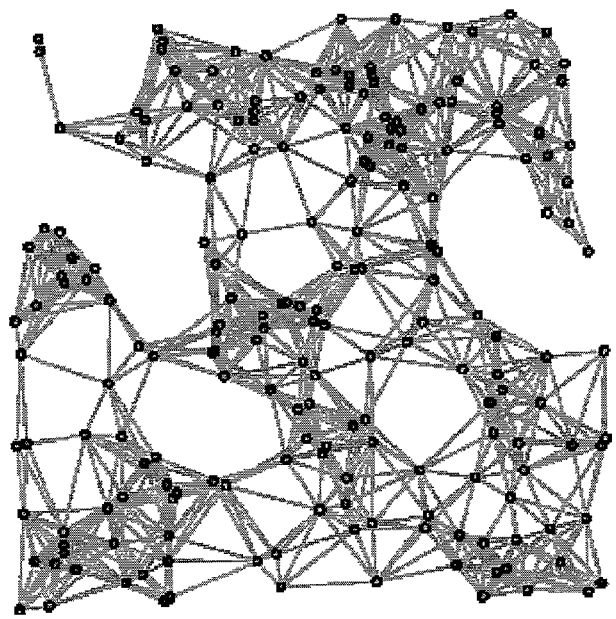
FIG. 11 shows a topology graph illustrating the effect of utilizing the cone-based algorithm with $\alpha = 2\pi/3$ on the wireless multi-hop network of FIG. 10. Specifically, use of the cone-based algorithm with $\alpha = 2\pi/3$ allows nodes in the dense areas of the topology to automatically reduce their transmission radius.
Figure 12:
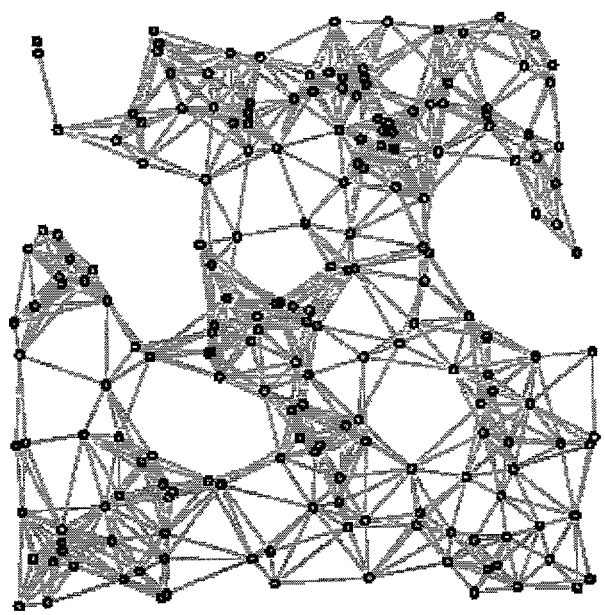
FIG. 12 illustrates a topology graph of FIG. 11 after the shrink-back operation has been performed allowing a number of boundary nodes to reduce their respective operational power.
Figure 13:
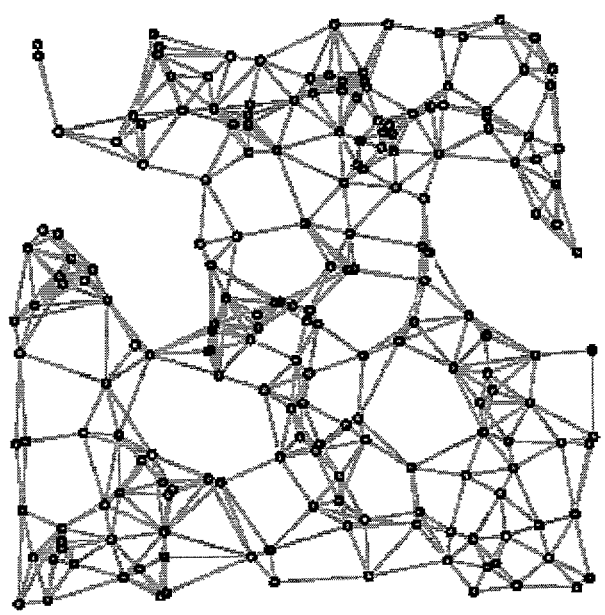
FIG. 13 shows a topology graph of FIG. 12 after a shrink back operation and special edge removal has been applied to remove edges wherein a first node is within the radius of a second node, yet the second node is not within the radius of the first node.
Figure 14:
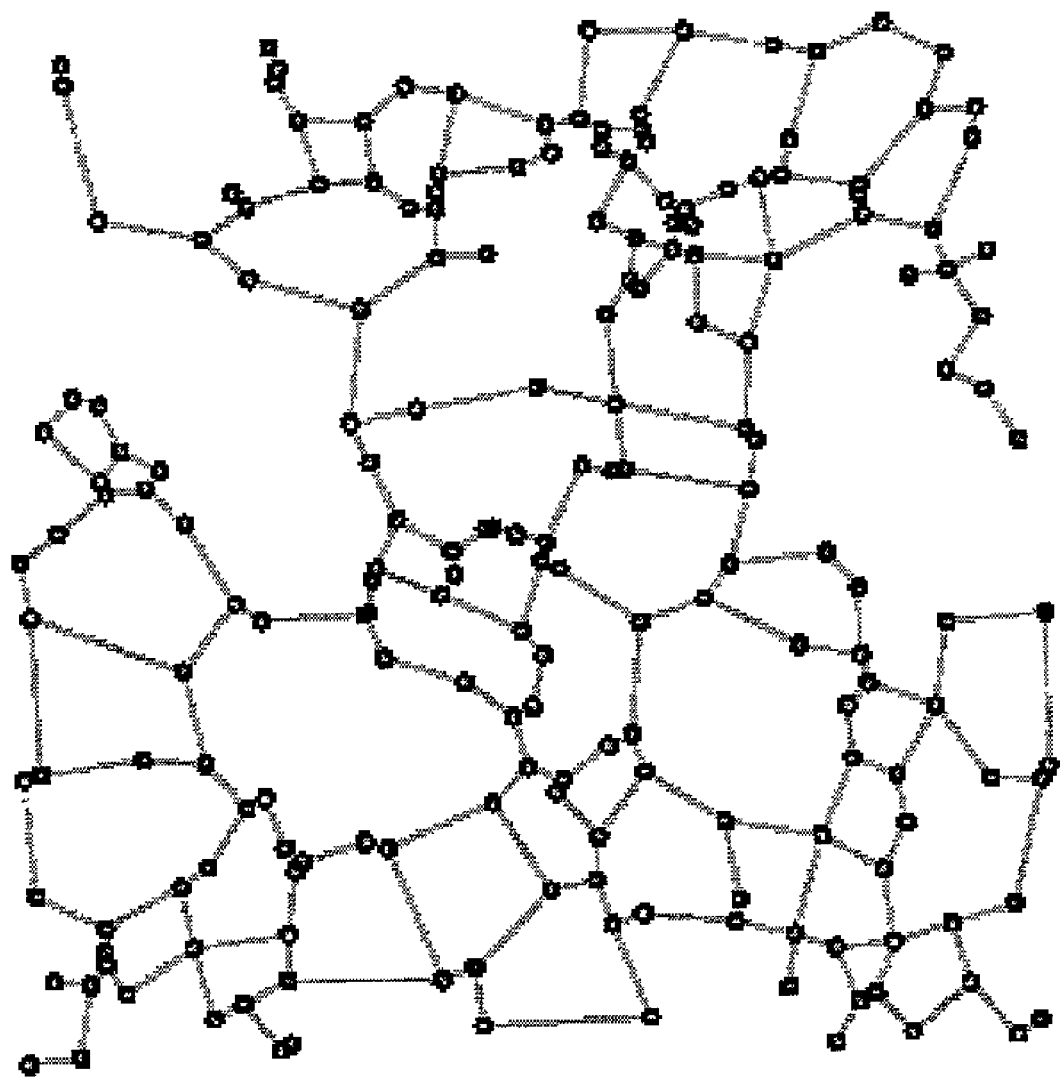
FIG. 14 shows a topology graph of FIG. 13 after a shrink back, special edge removal, and pair-wise edge removal optimizations have been applied to remove redundant communication edges in the network.

FIGS. 10–14 show topology graphs illustrating how the cone-based algorithm and the various optimizations improve network topology. FIG. 10 shows a topology graph in which no topology control is employed and every node transmits with the maximum power. FIG. 11 shows the corresponding graph produced by the cone-based algorithm with $\alpha=2\pi/3$. We can see that the latter allows nodes in the dense areas to automatically reduce their transmission radius. FIG. 12 illustrates the graph after the shrink-back operation is performed, in which some boundary nodes are allowed to reduce their radius. FIGS. 13 and 14 are the topology graphs after the special edge removal and pair-wise edge removal are applied, respectively.

Table 2 compares the cone-based algorithm with $\alpha=2\pi/3$ and $\alpha=5\pi/6$ in terms of average node degree and average radius.

TABLE 2

Average degree and radius of different topology control algorithms

| | Basic | | with op$_1$ | op$_1$ and | op$_1$, op$_2$, | | |
|---|---|---|---|---|---|---|---|
| | $\alpha = 5\pi/6$ | $\alpha = 2\pi/3$ | $\alpha = 5\pi/5$ | $\alpha = 2\pi/3$ | op$_2$ $\alpha = 2\pi/3$ | op$_3$ $\alpha = 2\pi/3$ | Max Power |
| Average Node Degree | 9.58 | 11.61 | 8.66 | 10.59 | 6.51 | 2.45 | 15.65 |
| Average Radius | 161 | 182 | 153 | 173 | 166 | 108 | 250 |

In Table 2 op$_1$ represents the shrink-back algorithm, op$_2$ represents the special edge removal algorithm, and op$_3$ represents the pair-wise edge removal algorithm. As expected, the table shows that a larger $\alpha$ results in smaller node degree and radius. However, it also shows that $\alpha=2\pi/3$ allows two more optimizations to be applied and these optimizations are very effective in reducing node degree and radius.

The "Max Power" column of Table 2 provides the performance numbers of the case of no topology control where the transmission power of each node is 250, the maximum. A comparison of the last two columns shows that cone-based algorithm with $\alpha=2\pi/3$ and all three optimizations applied achieves an average node degree of 2.45, which is less than one sixth of 15.65, and an average radius of 108, which is less than half of the maximum power.

Exemplary Wireless Multi-Hop Network Node

Figure 15:
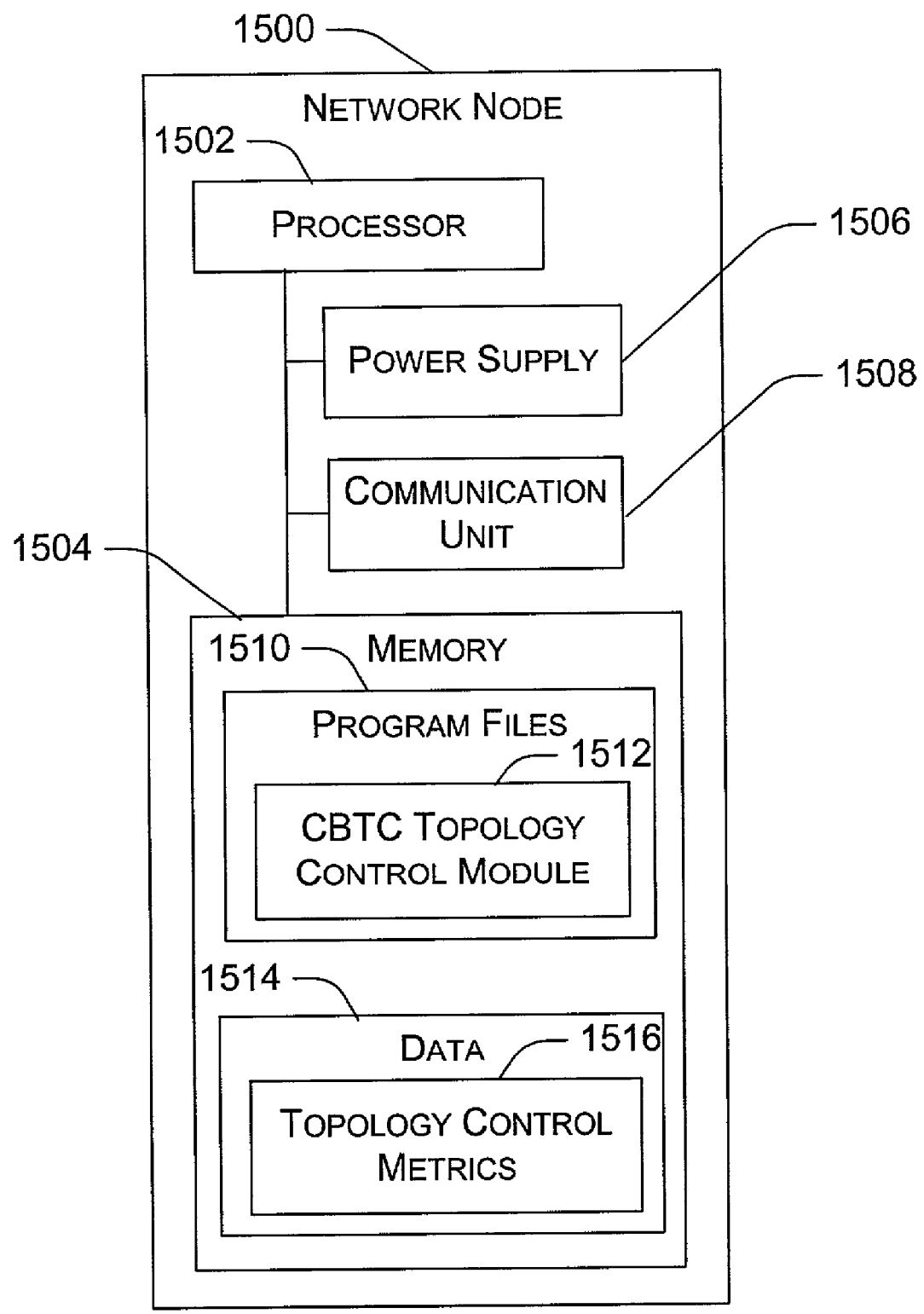
FIG. 15 shows aspect of an exemplary wireless network node for providing distributed topology control to a wireless multi-hop network.

FIG. 15 shows an exemplary wireless node 1500 to implement topology control in a wireless multi-hop network. The exemplary wireless node is only one example of a suitable computing environment and is not intended to suggest any limitation as to the scope of use or functionality of an exemplary system and procedure providing topology control to wireless multi-hop networks. The exemplary wireless node should not be interpreted as having any dependency or requirement relating to any one or combination of components illustrated in FIG. 15.

The exemplary system and procedure providing topology control to wireless multi-hop networks is operational with numerous other general purpose or special purpose computing system environments or configurations. Examples of well known computing systems, environments, and/or configurations that may be suitable for use with an system and procedure to provide topology control include, but are not limited to, personal computers, server computers, thin clients, thick clients, hand-held or laptop devices, multiprocessor systems, microprocessor-based systems, set top boxes, programmable consumer electronics, wireless phones, application specific integrated circuits (ASICS), network PCs, minicomputers, mainframe computers, distributed computing environments that include any of the above systems or devices, and the like.

The node 1500 includes a processor 1502 that is coupled to a system memory 1504, a power supply 1506, and a communication unit 1508. The system memory includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM, and/or the like.

The processor is configured to fetch and execute computer program instructions from application programs 1510 such as Cone-Based Topology Control (CBTC-$\alpha$) module 1512, an operating system (not shown), and so on. The processor also stores and fetches data 1514 such as topology control metrics information 1516 while executing the application programs.

The power supply 1506 provides operational power such as battery power to the node 1500. The communication unit 1508 such as a radio communication unit to send and receive messages to/from other nodes and computing devices.

The CBTC-$\alpha$ module 1512 may considerably increase network lifetime and maintain global connectivity with reasonable throughput in a wireless multi-hop network. Network lifetime is affected by determining efficient transmitting radii for each node in the network to communicate with particular ones of the other network nodes. As discussed in great detail above, this is accomplished while substantially guaranteeing a same maximum connected node set as when all nodes are transmitting with fall power. Additionally, in contrast to previous approaches for topology control in multi-hop networks that require node positional information, the CBTC-α module 1512 provides a solution that uses locally obtained directional information of other nodes to provide topology control to the network.

The CBTC-α module 1512 provides topology control to a network in a number of phases, which are summarized as follows. Starting with a small transmission radius, each node (denoted by node u) broadcasts a neighbor-discovery message. Each receiving node acknowledges this broadcast message. Node u records all acknowledgments and the directions they came from. Node u then determines whether there is at least one neighbor in every cone of α degrees, centered on Node u. In this first phase, Node u continues the neighbor discovering process by increasing its transmission radius (operational power) until either the above condition is met or an optimal termination power P (e.g., a power that is less than or equal to the nodes maximum transmission power) is reached. For α smaller than or equal to $5\pi/6$, the algorithm substantially guarantees a maximum connected node set and power efficient connectivity between various node sets.

In an optional second phase, and without impacting node connectivity, the CBTC-α module 1512 removes special and redundant edges to reduce the node degrees and thereby reduce signal interference and data throughput.

Computer-Executable Instructions

An exemplary system and procedure providing topology control may be described in the general context of computer-executable instructions, such as program modules, being executed by a computer. Generally, program modules include routines, programs, objects, components, data structures, etc. that perform particular tasks or implement particular abstract data types. An exemplary system and procedure providing topology control may also be practiced in distributed computing environments where tasks are performed by remote processing devices that are linked through a communications network. In a distributed computing environment, program modules may be located in both local and remote computer storage media including memory storage devices.

Computer Readable Media

An exemplary system and procedure providing topology control may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Exemplary Procedure

Figure 16:
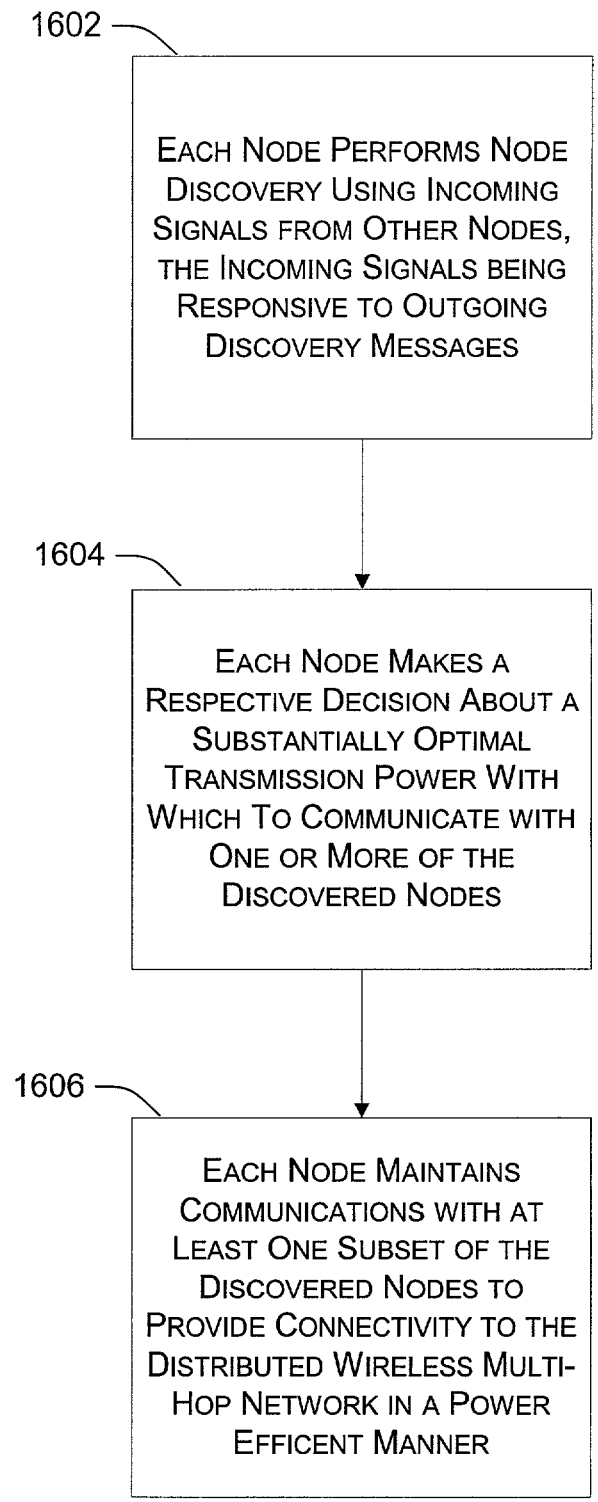
FIG. 16 shows an exemplary procedure for providing distributed topology control to a wireless multi-hop network.

FIG. 16 shows an exemplary procedure to provide topology control to a wireless multi-hop network. At block 1602, each node (e.g., a node 1500 of FIG. 12) performs node discovery using incoming signals from other nodes in the network. The Incoming signals are in response to a discover neighbor message communicated by a respective node. At block 1604, each node makes a respective decision about a substantially optimal transmission power with which to communicate the one or more of the discovered nodes (block 1602). This decision is based on the incoming signals. Significantly, this decision is also made independent of positional information such as latitude and longitude.

At block 1606, each node maintains communications with at least one subset of the discovered nodes to provide connectivity to the distributed wireless multi-hop network.

Conclusion

Although the system and procedure providing topology control to a wireless multi-hop network has been described in language specific to structural features and/or methodological operations, it is to be understood that the system and procedure to system and procedure providing topology control to a wireless multi-hop network defined in the appended claims is not necessarily limited to the specific features or operations described. Rather, the specific features and operations are disclosed as preferred forms of implementing the claimed present subject matter.

The invention claimed is:

1. A method providing topology control to a distributed wireless multi hop network comprising a plurality of nodes, the method comprising;
    for each node, discovering a set of neighboring nodes of the nodes using a set of incoming signals from the neighboring nodes, the incoming signals being responsive to receipt by the neighboring nodes of an outgoing signal from a respective node of the nodes;
    for each node, making a respective decision about a substantially optimal transmission power to communicate with at least one subset of the neighboring nodes, the respective decision being based on the incoming signals and being independent of positional information;
    for each node, maintaining communications with the at least one subset to provide connectivity between each of the nodes.

2. A method as recited in claim 1, wherein collectively each respective decision provides substantially complete connectivity between the nodes in a power efficient manner.

3. A method as recited in claim 1, wherein an incoming signal comprises directional information.

4. A method as recited in claim 1, wherein an incoming signal comprises directional information and an indication of transmission power used by a neighboring node of the neighboring nodes to communicate the incoming signal.

5. A method as recited in claim 1, further comprising:
    identifying a particular cone of degree α that is within a boundary node's transmission radius that is not covered by at least one other node of the nodes, α being less than or equal to $5\pi/6$; and decreasing the boundary node's transmission radius to exclude other nodes of the nodes that were acquired within the boundary node's transmission radius as part of an attempt to communicate with a nodes of the nodes in the particular cone.

6. A method as recited in claim 1, further comprising:
detecting a change in topology of the wireless multi-hop network by a first node of the nodes, the change corresponding to a second node of the nodes entering or leaving a radius of coverage corresponding to the first node; and
responsive to detecting the change, dynamically reconfiguring the at least one subset of nodes with which the first node maintains communications to provide collective connectivity between each of the nodes in a manner that reflects the change.

7. A method as recited in claim 1, further comprising removing a special edge from the wireless multi-hop network, an edge being a communication pathway between two nodes of the nodes, and wherein an edge is a special edge if: (a) a first node of the at least two nodes is inside of a first transmission radius that corresponds to a second node of the at least two nodes; and (b) the second node is outside of a second transmission radius that corresponds to the first node.

8. A method as recited in claim 1, wherein discovering the neighboring nodes further comprises:
broadcasting the outgoing signal in all directions at a portion of a substantially optimal termination power;
receiving the incoming signals; and
wherein making the respective decision further comprises:
determining whether a predetermined criteria has been met; and
responsive to determining that the predetermined criteria has not been met:
(a) increasing the portion by a quantum;
(b) re-broadcasting the outgoing signal at the portion;
(c) receiving a set of incoming signals;
(d) determining whether the predetermined criteria has been met; and
(e) responsive to determining that the predetermined criteria has not been met, repeating (a) through (e) until either the predetermined criteria is met or until the portion reaches the substantially optimal termination power.

9. A method as recited in claim 8, wherein the substantially optimal termination power is less than or equal to a node's maximum transmission power.

10. A method as recited in claim 8, wherein the predetermined criteria is based on identifying at least one node of the neighboring nodes within each of a plurality of cones of degree $\alpha$, each cone being centered on the respective node and spanning a degree of $\alpha/2$ on each side of the at least one node, the cones collectively spanning $2\pi$ degrees around the respective node.

11. A method as recited in claim 10, wherein $\alpha \leq 5\pi/6$.

12. A method as recited in claim 1, wherein an edge is a communication pathway between at least two nodes of the nodes, wherein connectivity in the multi-hop network is represented by a plurality of edges in a topological graph, and wherein the method further comprises removing a redundant edge from the wireless multi-hop network.

13. A method as recited in claim 12, wherein removing the redundant edge further comprises:
assigning each edge (u, v) an edge ID as represented by:

$eid(u, v) = i1, i2, i3$, where i1=d(u, v), i2=max(node IDs of u and v), and i3=min(node IDs of u and v); and
comparing edge IDs based on lexicographical order, wherein given any $\theta \leq \pi/3$ and given any pair of edges (u, v) and edges (u, w) such that angle vuw<$\theta$, a communication pathway between nodes (u, v) is a redundant edge if a first edge ID of (u, v) is greater than a second edge ID (u, w).

14. A computer-readable medium comprising computer-executable instructions providing topology control to a distributed wireless multi hop network comprising a plurality of nodes, the computer-executable instructions comprising instructions for:
for each node, discovering a set of neighboring nodes of the nodes using a set of incoming signals from the neighboring nodes, the incoming signals being responsive to receipt by the neighboring nodes of an outgoing signal from a respective node of the nodes;
for each node, making a respective decision about a substantially optimal transmission power to communicate with at least one subset of the neighboring nodes, the respective decision being based on the incoming signals and being independent of positional information;
for each node, maintaining communications with the at least one subset to provide connectivity between each of the nodes.

15. A computer-readable medium as recited in claim 14, wherein collectively each respective decision provides substantially complete connectivity between the nodes in a power efficient manner.

16. A computer-readable medium as recited in claim 14, wherein an incoming signal comprises directional information.

17. A computer-readable medium as recited in claim 14, wherein an incoming signal comprises directional information and an indication of transmission power used by a neighboring node of the neighboring nodes to communicate the incoming signal.

18. A computer-readable medium as recited in claim 14, wherein the computer-executable instructions further comprise instructions for:
detecting a change in topology of the wireless multi-hop network by a first node of the nodes, the change corresponding to a second node of the nodes entering or leaving a radius of coverage corresponding to the first node; and
responsive to detecting the change, dynamically reconfiguring the at least one subset of nodes with which the first node maintains communications to provide collective connectivity between each of the nodes in a manner that reflects the change.

19. A computer-readable medium as recited in claim 14, wherein the computer-executable instructions further comprise instructions for:
identifying a particular cone of degree $\alpha$ that is within a boundary node's transmission radius that is not covered by at least one other node of the nodes, $\alpha$ being less than or equal to $5\pi/6$; and
decreasing the boundary node's transmission radius to exclude other nodes of the nodes that were acquired within the boundary node's transmission radius as part of an attempt to communicate with a nodes of the nodes in the particular cone.

20. A computer-readable medium as recited in claim 14, further comprising instructions for removing a special edge from the wireless multi-hop network, an edge being a communication pathway between at least two nodes of the nodes, and wherein an edge is a special edge if: (a) a first node of the at least two nodes is inside of a first transmission radius that corresponds to a second node of the at least two nodes; and (b) the second node is outside of a second transmission radius that corresponds to the first node.

21. A computer-readable medium as recited in claim 14, wherein the instructions for discovering the neighboring nodes further comprise instructions for:
   broadcasting the outgoing signal in all directions at a portion of a substantially optimal termination power;
   receiving the incoming signals; and
   wherein making the respective decision further comprises:
   determining whether a predetermined criteria has been met; and
   responsive to determining that the predetermined criteria has not been met:
   (a) increasing the portion by a quantum;
   (b) re-broadcasting the outgoing signal at the portion;
   (c) receiving a set of incoming signals;
   (d) determining whether the predetermined criteria has been met; and
   (e) responsive to determining that the predetermined criteria has not been met, repeating (a) through (e) until either the predetermined criteria is met or until the portion reaches the substantially optimal termination power.

22. A computer-readable medium as recited in claim 21, wherein the substantially optimal termination power is less than or equal to a node's maximum transmission power.

23. A computer-readable medium as recited in claim 21, wherein the predetermined criteria is based on identifying at least one node of the neighboring nodes within each of a plurality of cones of degree $\alpha$, each cone being centered on the respective node and spanning a degree of $\alpha/2$ on each side of the at least one node, the cones collectively spanning $2\pi$ degrees around the respective node.

24. A computer-readable medium as recited in claim 23, wherein $\alpha <= 5\pi/6$.

25. A computer-readable medium as recited in claim 14, wherein an edge is a communication pathway between at least two nodes of the nodes, wherein connectivity in the multi-hop network is represented by a plurality of edges in a topological graph, and wherein the computer-executable instructions further comprise instructions for removing a redundant edge from the wireless multi-hop network.

26. A computer-readable medium as recited in claim 25, wherein the computer-executable instructions for removing the redundant edge further comprises instructions for:
   assigning each edge (u, v) an edge ID as represented by:

$eid(u, v)=(i1, i2, i3)$, where $i1=d(u, v)$, $i2=\max$(node IDs of u and v), and $i3=\min$(node IDs of u and v); and
   comparing edge IDs based on lexicographical order, wherein given any $\theta \leq \pi/3$ and given any pair of edges (u, v) and edges (u, w) such that angle vuw<$\theta$, a communication pathway between nodes (u, v) is a redundant edge if a first edge ID of (u, v) is greater than a second edge ID (u, w).

27. A computing device comprising:
   a memory comprising computer-executable instructions for providing location-based topology control to a wireless multi-hop network comprising a plurality of nodes;
   a processor that is operatively coupled to the memory, the processor being configured to fetch and execute the computer-executable instructions from the memory, the computer-executable instructions comprising instructions for:
   for each node, discovering a set of neighboring nodes of the nodes using a set of incoming signals from the neighboring nodes, the incoming signals being responsive to receipt by the neighboring nodes of an outgoing signal from a respective node of the nodes;
   for each node, making a respective decision about a substantially optimal transmission power to communicate with at least one subset of the neighboring nodes, the respective decision being based on the incoming signals and being independent of positional information;
   for each node, maintaining communications with the at least one subset to provide connectivity between each of the nodes.

28. A computing device as recited in claim 27, wherein collectively each respective decision provides substantially complete connectivity between the nodes in a power efficient manner.

29. A computing device as recited in claim 27, wherein an incoming signal comprises directional information.

30. A computing device as recited in claim 27, wherein an incoming signal comprises directional information and an indication of transmission power used by a neighboring node of the neighboring nodes to communicate the incoming signal.

31. A computing device as recited in claim 27, wherein the computer-executable instructions further comprise instructions for:
   detecting a change in topology of the wireless multi-hop network by a first node of the nodes, the change corresponding to a second node of the nodes entering or leaving a radius of coverage corresponding to the first node; and
   responsive to detecting the change, dynamically reconfiguring the at least one subset of nodes with which the first node maintains communications to provide collective connectivity between each of the nodes in a manner that reflects the change.

32. A computing device as recited in claim 27, wherein the computer-executable instructions further comprise instructions for:
   is identifying a particular cone of degree $\alpha$ that is within a boundary node's transmission radius that is not covered by at least one other node of the nodes, $\alpha$ being less than or equal to $5\pi/6$; and
   decreasing the boundary node's transmission radius to exclude other nodes of the nodes that were acquired within the boundary node's transmission radius as part of an attempt to communicate with a nodes of the nodes in the particular cone.

33. A computing device as recited in claim 27, further comprising instructions for removing a special edge from the wireless multi-hop network, an edge being a communication pathway between at least two nodes of the nodes, and wherein an edge is a special edge if: (a) a first node of the at least two nodes is inside of a first transmission radius that corresponds to a second node of the at least two nodes; and (b) the second node is outside of a second transmission radius that corresponds to the first node.

34. A computing device as recited in claim 27, wherein the instructions for discovering the neighboring nodes further comprise instructions for:
- broadcasting the outgoing signal in all directions at a portion of a substantially optimal termination power;
- receiving the incoming signals; and
- wherein making the respective decision further comprises:
- determining whether a predetermined criteria has been met; and
- responsive to determining that the predetermined criteria has not been met:
  (a) increasing the portion by a quantum;
  (b) re-broadcasting the outgoing signal at the portion;
  (c) receiving a set of incoming signals;
  (d) determining whether the predetermined criteria has been met; and
  (e) responsive to determining that the predetermined criteria has not been met, repeating (a) through (e) until either the predetermined criteria is met or until the portion reaches the substantially optimal termination power.

35. A computing device as recited in claim 34, wherein the substantially optimal termination power is less than or equal to a node's maximum transmission power.

36. A computing device as recited in claim 35, wherein the predetermined criteria is based on identifying at least one node of the neighboring nodes within each of a plurality of cones of degree $\alpha$, each cone being centered on the respective node and spanning a degree of $\alpha/2$ on each side of the at least one node, the cones collectively spanning $2\pi$ degrees around the respective node.

37. A computing device as recited in claim 36, wherein $\alpha <= 5\pi/6$.

38. A computing device as recited in claim 27, wherein an edge is a communication pathway between at least two nodes of the nodes, wherein connectivity in the multi-hop network is represented by a plurality of edges in a topological graph, and wherein the computer-executable instructions further comprise instructions for removing a redundant edge from the wireless multi-hop network.

39. A computing device as recited in claim 38, wherein the computer-executable instructions for removing the redundant edge further comprise instructions for:
- assigning each edge (u, v) an edge ID as represented by:

$$eid(u, v)=(i1, i2, i3),$$

where $i1=d(u, v)$, $i2=\max$(node IDs of u and v), and $i3=\min$(node IDs of u and v); and
- comparing edge IDs based on lexicographical order, wherein given any $\theta \leq \pi/3$ and given any pair of edges (u, v) and edges (u, w) such that angle vuw<$\theta$, a communication pathway between nodes (u, v) is a redundant edge if a first edge ID of (u, v) is greater than a second edge ID (u, w).

* * * * *